April 8, 1930.

H. M. FRIENDLY

AUTOMATIC TELEPHONE SYSTEM

Re. 17,638

Original Filed Feb. 17, 1921 9 Sheets-Sheet 1

Inventor
Herbert M. Friendly
Gabel & Mueller
Attys.

April 8, 1930. H. M. FRIENDLY Re. 17,638

AUTOMATIC TELEPHONE SYSTEM

Original Filed Feb. 17, 1921 9 Sheets-Sheet 2

April 8, 1930.

H. M. FRIENDLY

AUTOMATIC TELEPHONE SYSTEM

Re. 17,638

Original Filed Feb. 17, 1921 9 Sheets-Sheet 3

Inventor
Herbert M. Friendly
Gabel & Mueller
Attys.

April 8, 1930.

H. M. FRIENDLY

AUTOMATIC TELEPHONE SYSTEM

Re. 17,638

Original Filed Feb. 17, 1921 9 Sheets-Sheet 4

Inventor
Herbert M. Friendly
Gabler & Mueller
Attys.

April 8, 1930.
H. M. FRIENDLY
AUTOMATIC TELEPHONE SYSTEM
Re. 17,638
Original Filed Feb. 17, 1921 9 Sheets-Sheet 5
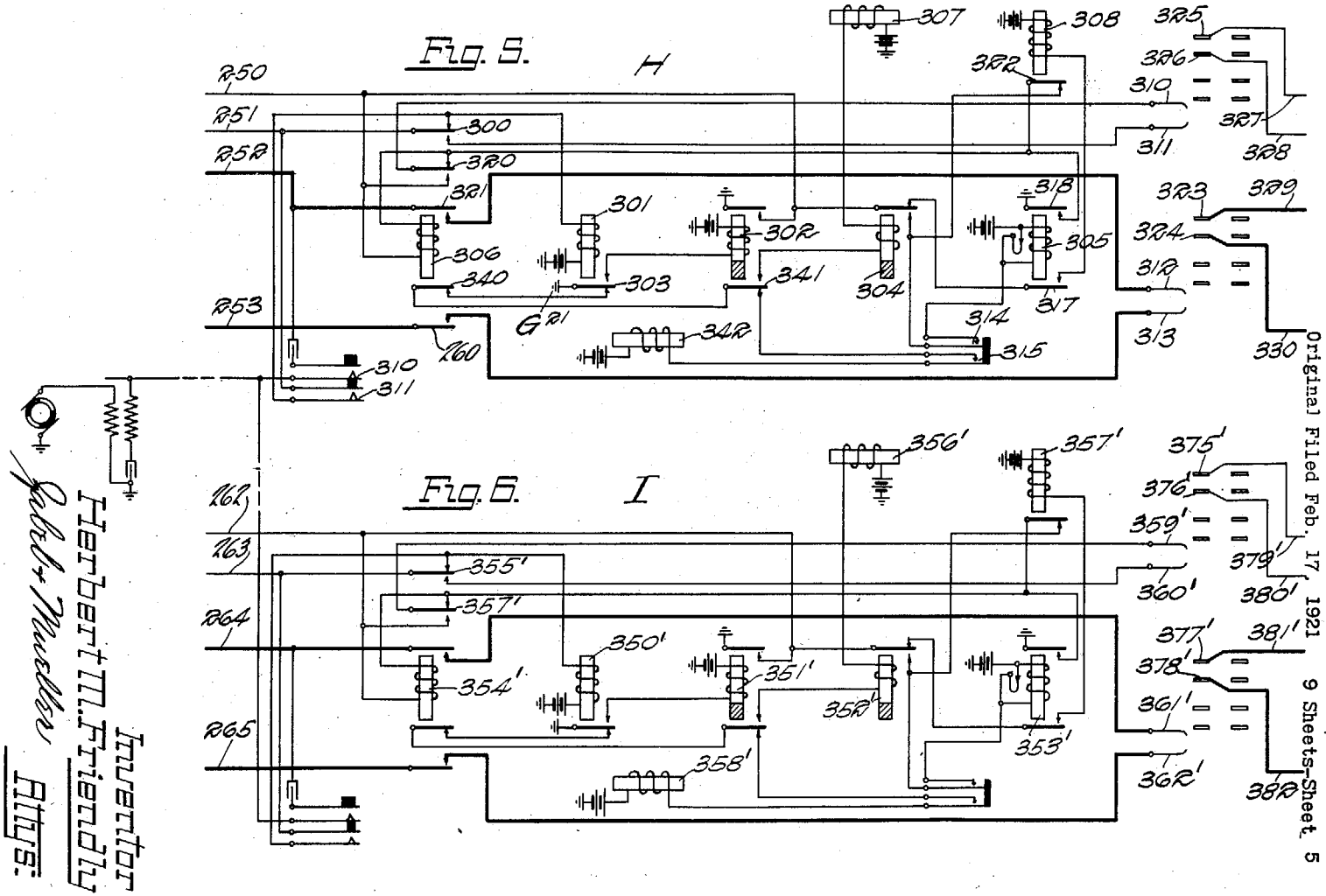
Inventor
Herbert M. Friendly
Fabel & Mueller
Attys.

April 8, 1930.
H. M. FRIENDLY
AUTOMATIC TELEPHONE SYSTEM
Re. 17,638
Original Filed Feb. 17, 1921 9 Sheets-Sheet 6
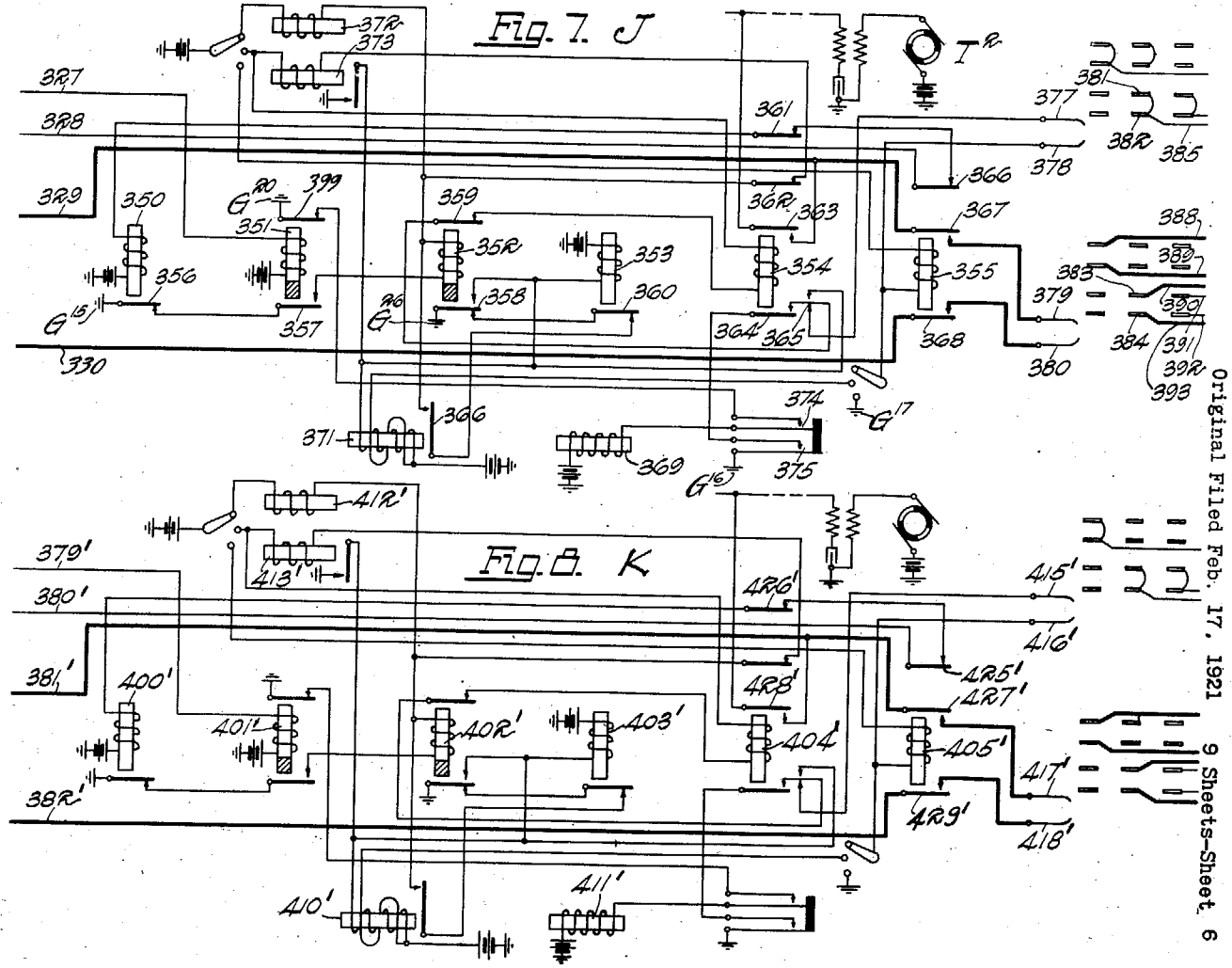
Inventor
Herbert M. Friendly
Gabel & Mueller
Attys:

April 8, 1930.
H. M. FRIENDLY
AUTOMATIC TELEPHONE SYSTEM
Original Filed Feb. 17, 1921
Re. 17,638
9 Sheets-Sheet 7
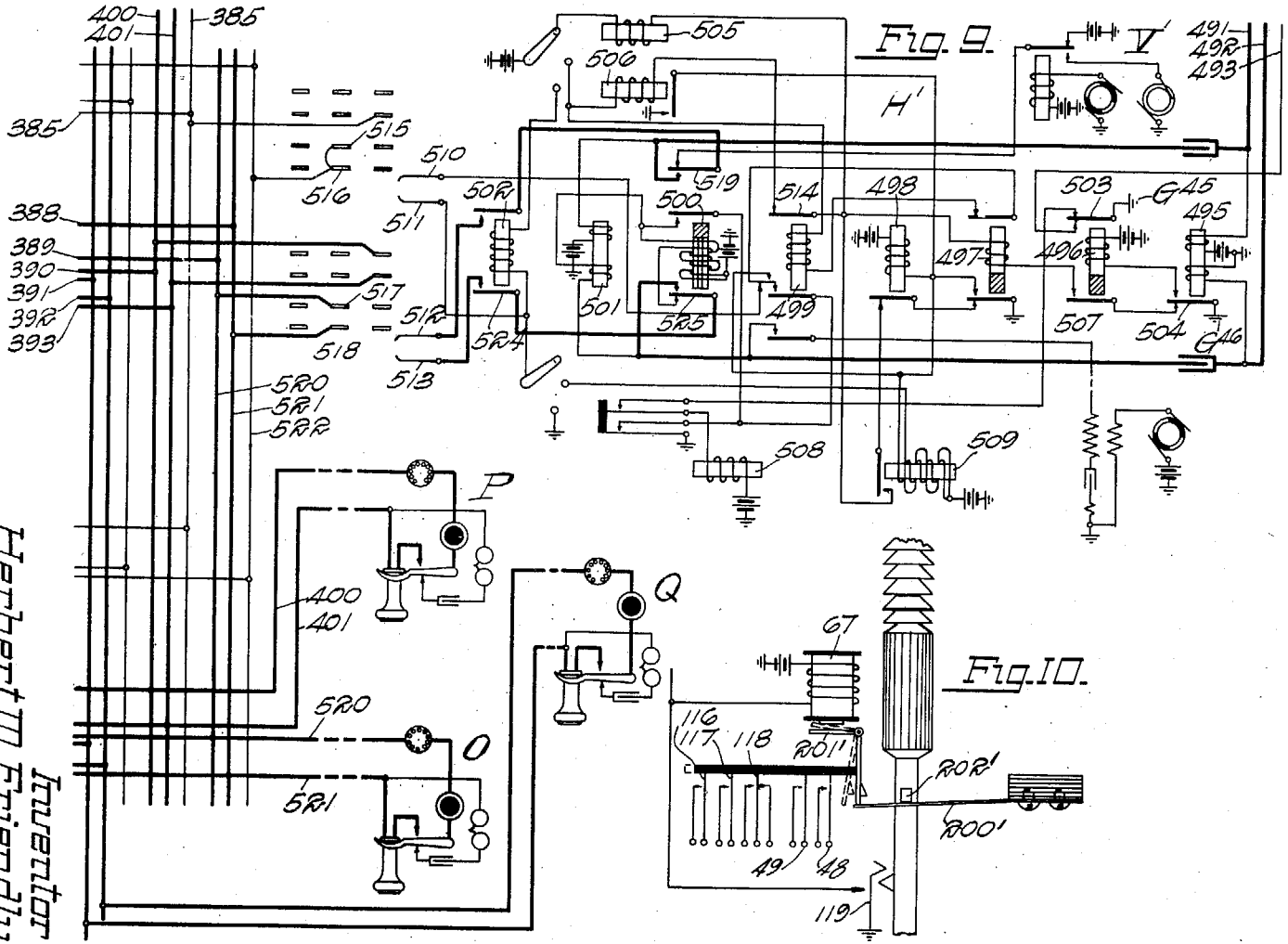
Inventor
Herbert M. Friendly
Gabel & Mueller
Attys.

April 8, 1930.
H. M. FRIENDLY
AUTOMATIC TELEPHONE SYSTEM
Re. 17,638
Original Filed Feb. 17, 1921 9 Sheets-Sheet 8
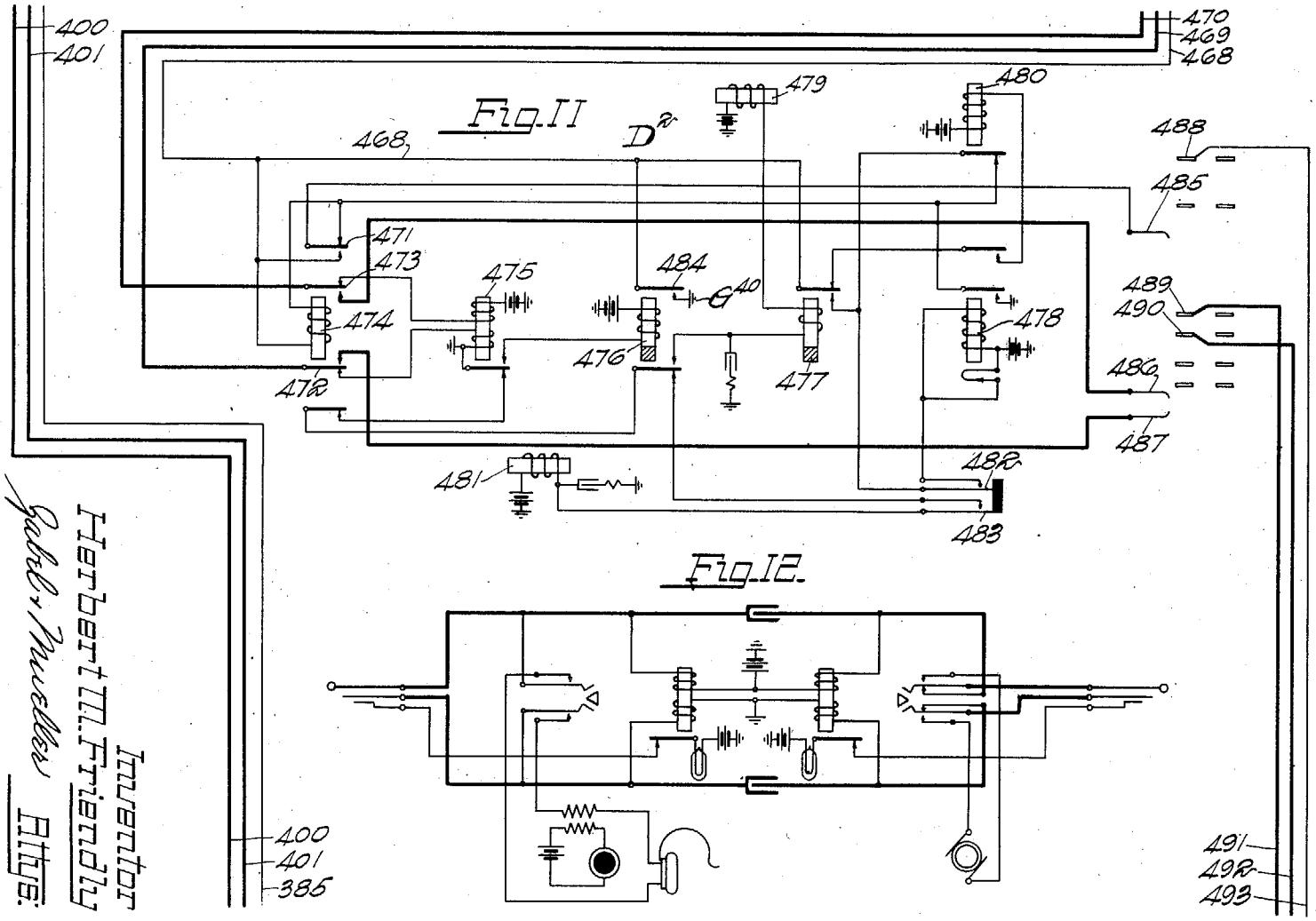
Inventor
Herbert M. Friendly
Gabel & Mueller Attys.

April 8, 1930.
H. M. FRIENDLY
AUTOMATIC TELEPHONE SYSTEM
Original Filed Feb. 17, 1921 9 Sheets-Sheet 9
Re. 17,638
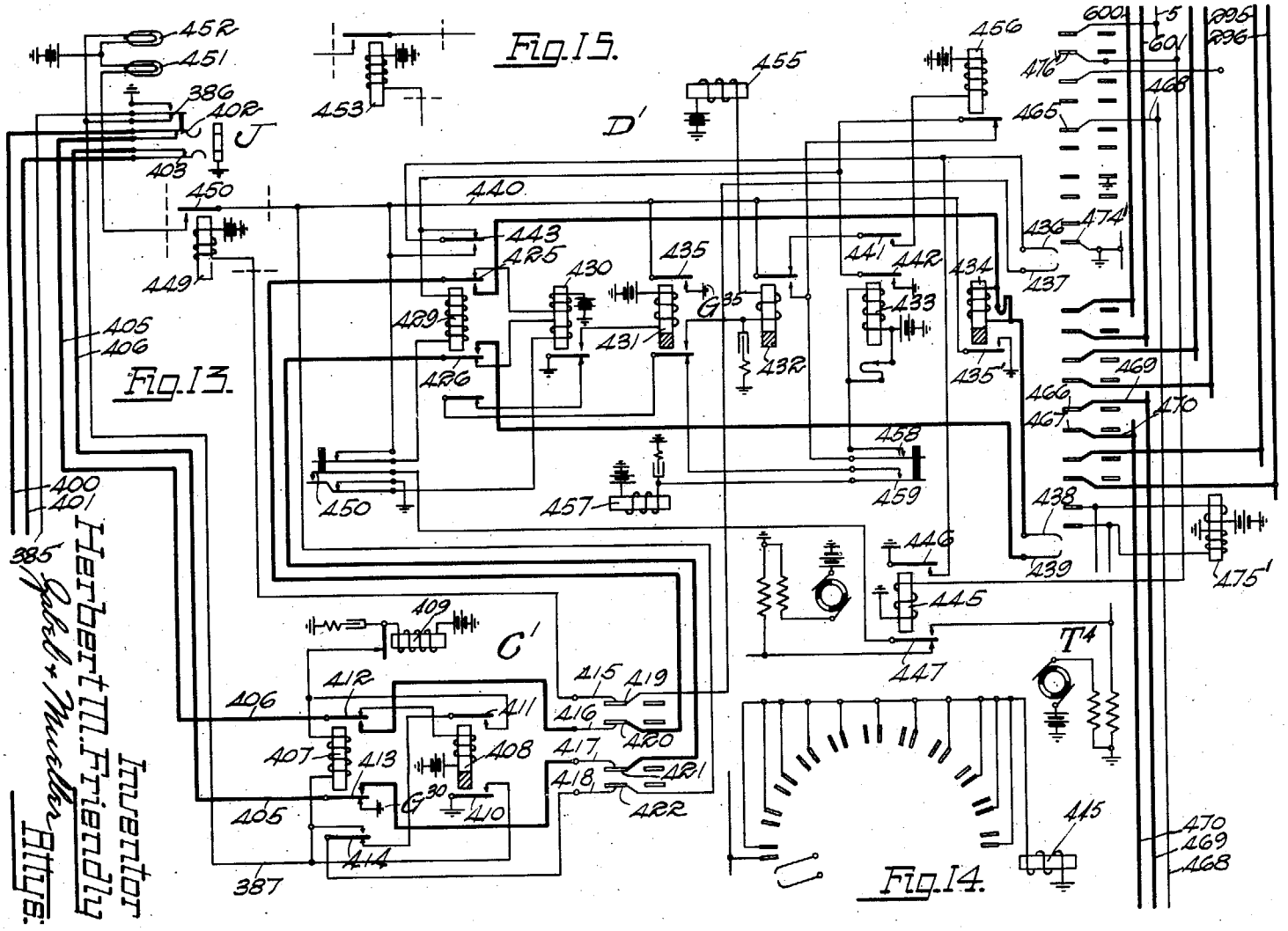
Inventor
Herbert M. Friendly
Gabel & Mueller
Attys.

Reissued Apr. 8, 1930 Re. 17,638

UNITED STATES PATENT OFFICE

HERBERT M. FRIENDLY, OF CHICAGO, ILLINOIS

AUTOMATIC TELEPHONE SYSTEM

Original application filed February 17, 1921, Serial No. 445,761. Renewed November 8, 1926. Original No. 1,627,844, dated May 10, 1927. Application for reissue filed August 24, 1927. Serial No. 215,247.

The present invention relates in general to an automatic telephone system, and is particularly adapted to a system that includes a main exchange, having a plurality of branch offices tributary to it.

More specifically, the invention relates to an improved method and apparatus for permitting either a calling party in the main exchange or a called subscriber in a branch exchange to transfer the call to another desired subscriber in the branch exchange. Other systems have been invented which embody certain arrangements of this nature, but herein are provided many new features together with improvements in the structure of such a system.

Among the important features of the invention an arrangement is provided whereby, after a call has been transferred from one branch exchange subscriber to another the three parties may remain on the line for a conference, and as soon as this is terminated either party at the branch exchange may release the other by dialing the digit 1; or should this feature not be desirable the first called party may be automatically released upon the second called party answering.

Another important feature is the provision of means whereby if the branch exchange subscriber upon receiving a call should desire to obtain information from another subscriber in the branch exchange without the knowledge of the calling party he may do so by dialing the calling man on to a holding circuit, after which the called party may release and call normally in the branch exchange or into the main exchange; after obtaining the information desired, the called subscriber may again connect with the original calling subscriber and subsequently pass or transfer the calls as in the ordinary operation of the system.

Means are also provided whereby certain (or all) branch exchange subscribers may have special services of an operator if they so desire.

These and other features of the invention will be fully disclosed hereinafter.

Referring now to the drawings:

Fig. 1 shows a schematic trunking diagram of the system disclosed in the remaining drawings.

Fig. 1[a] shows the manner in which the different sheets of drawings are placed for a complete view of the system.

In Fig. 2 the apparatus at the main exchange is shown diagrammatically and consists of a subscriber's substation A, having a preselector or rotary lineswitch $C^5$ individual thereto, and which has access in common with a plurality of other similar lineswitches to first selectors of the standard Keith-Erickson two wire class, one of which is shown at E. These selectors have access to selector repeaters off a certain level of bank contacts. The selector repeaters may be of any well known two wire type such as that shown in Fig. 1 of the patent to Emil Jacobsen No. 1,332,217, issued March 2, 1920. These selector repeaters have access to trunk lines going to branch exchanges, one of these is shown in the drawings and comprising the conductors 26 and 27.

These trunk lines terminate in what is known as dual selector switches in the branch exchanges. The switches are of the general type shown in Figs. 9 and 10 of the British patent to Friendly 139,000 the circuits of which are modified in accordance with the features of the present invention. The trunk line comprising conductors 26 and 27 is shown terminating in such a dual switch, Figs. 3 and 4.

In Figs. 5, 6, 11 and 13 ordinary selector switches of the Keith-Erickson two wire type are shown, the circuits of which have been modified to operate in this system.

Figs. 7, 8, and 9 show connector switches of the well known Strowger type which also have been modified as will appear fully hereinafter.

Fig. 10, shows an improvement that has been designed for controlling a large number of off normal springs when the weight of the switch shaft is inadequate to shift them.

Fig. 12 shows an operator's cord-pair.

Figs. 14 and 15 show certain details of the present invention which will be described fully hereinafter.

Figure 1:
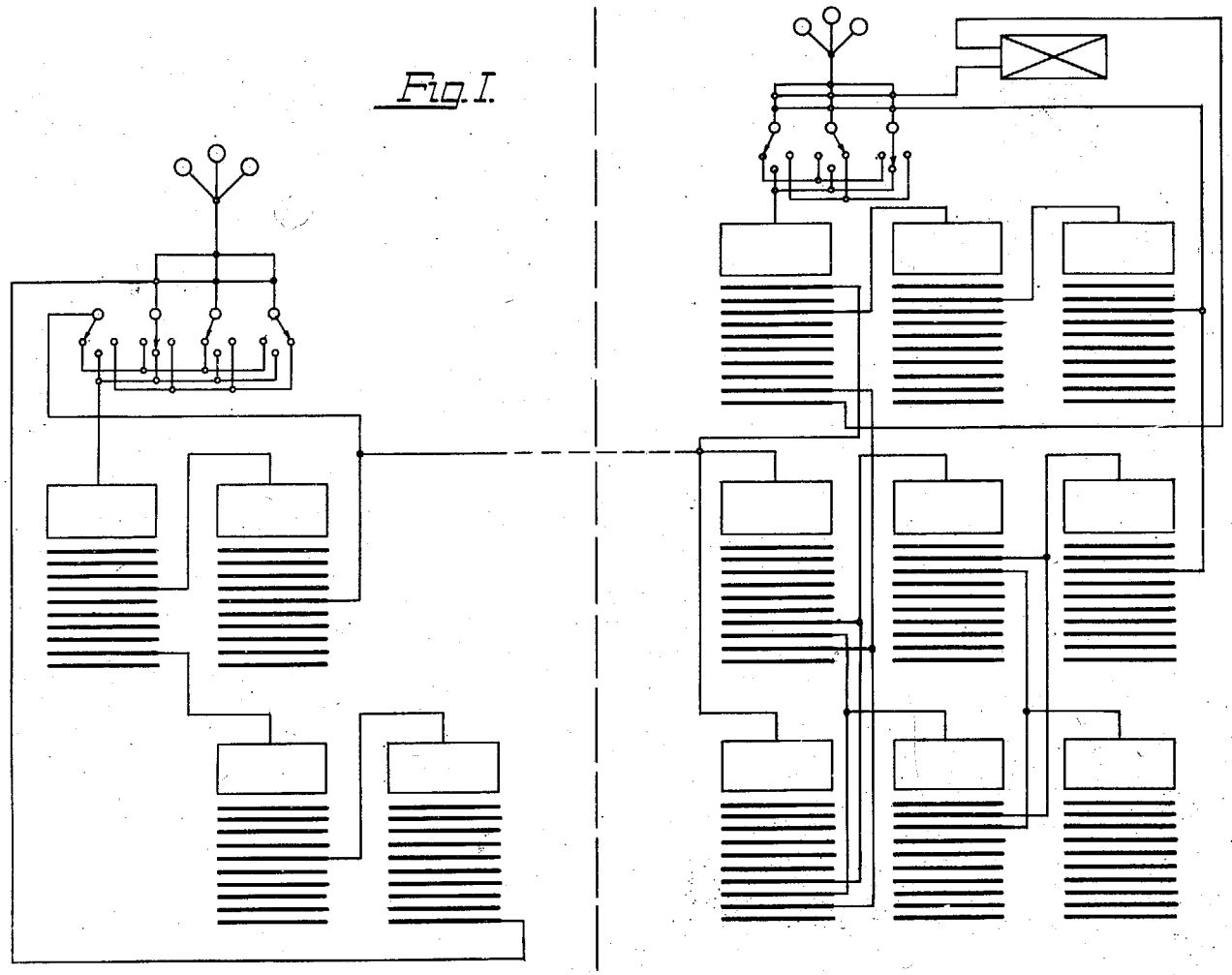

While in the drawings a plurality of batteries have been shown, it will be understood that there is preferably, but one battery having its negative pole grounded for each exchange.

The operation of this improved system will now be described in general, reference being had to Fig. 1.

Let us consider first what is shown on the left of the dotted line, where is indicated the apparatus in the main exchange. The subscribers' lines shown in the upper left hand corner of the sheet are provided at the exchange with individual rotary line switches having common access to a group of selector switches, one of which is indicated by the square at the left of the sheet. This is an ordinary Strowger switch of the usual mechanical construction. The banks of which are indicated by 10 heavy lines corresponding to ten levels. One level of these selector switches terminate selector repeaters one of which is shown immediately to the right of the first selector. Another level of the selector switches has access to local second selectors shown diagrammatically at the bottom square on the left; and as shown one level of these selectors go to local connectors which have access to main exchange subscriber's lines. The selector repeaters have access to trunk lines going to the branch exchanges and terminating there in dual selectors, one of which is shown terminating in the dual selector switches in the branch exchange. The switches in the branch exchange shown on the right of the dotted line consist of two groups, those used in a local call and those used in an incoming call. The dual incoming selectors have access to incoming second selectors off certain levels of their bank contacts. These second selectors have access to incoming connectors which are adapted to connect with local subscribers' lines. The local subscribers, shown at upper extremity of the drawing, have each an individual rotary line switch which has access to local branch exchange first selectors. A certain level of these selectors, the second as shown, is multipled into the second level of the incoming dual selectors, this is for a special purpose as will later appear. Other levels have access to local second selectors, while the 0 level is used for outgoing calls to the main exchange.

The process of setting up connections will now be briefly considered. Suppose first that a subscriber in main exchange wishes to connect with a subscriber in the branch exchange. When the receiver is removed at the calling station the rotary line switch individual thereto operates to select an idle first selector. The calling subscriber will thereupon dial the digit, which corresponds to the level leading to the selector repeater and which in this case is the digit 7. When this digit is called the selector steps to the seventh level and operates to automatically select an idle selector repeater. The calling subscriber may now call the digit 6 whereupon the selector repeater will operate vertically to the sixth level and rotate to find an idle trunk line going to the branch exchange and terminating there in a dual selector. The calling party may now call the remaining four digits of the desired branch exchange subscriber's number whereupon the connection will be completed in the usual manner. If it should be found, upon the called subscriber answering, that another branch exchange subscriber was wanted, the called party can by calling that local subscriber's number, connect with that subscriber by means of the other element of the dual selector. When this party answers the three subscribers may remain on the line for a conference or the first (or second) called party may hang up leaving the second (or first) called and original calling parties in communication with each other. The call may be again passed, if necessary, as many times as desirable.

Let us consider also the case of where the called party desires to communicate with another subscriber in the branch exchange. He will dial the digit 2 which will cause the other dual selector element to step to the level and connect with the holding trunk which is multipled into the second level of the local branch exchange first selectors. The called subscriber may now release the connection to himself and use the local branch exchange switches to call another party. After obtaining whatever information he desires he may dial the digit 2 which will cause the local first selector to step to the second level and then rotate into connection with the holding trunk. The called party is now in communication with the original calling party again and the call may be passed as in the case first mentioned.

The local branch exchange subscribers by dialing 0 operate a first selector vertically to the tenth level whereupon the switch automatically rotates to find an idle two way trunk going to the main exchange. As soon as this is found the line switch associated therewith in the main exchange operates to select an idle first selector whereafter the call is completed in the usual manner to a main exchange subscriber.

Special service is also provided for certain subscribers in the branch exchange. By removing their receivers and dialing 1 the first selector under their control is stepped to the first level and automatically rotated. This action serves to light a line lamp before an operator who can now respond and set up a connection from the calling line either manually or automatically in a well-known manner.

Having described the general objects of this invention and the general manner of obtaining these objects, the detailed operation of a system embodying those improvements will now be considered.

For this purpose it will be assumed that a subscriber at substation A in the main exchange desires to call the branch exchange subscriber at substation P and that the said calling subscriber has, by operating his calling device for a series of digits seized the two way trunk line comprising conductors 26 and 27 by means of the selector repeater C, in a well known manner.

When the call is thus extended to the trunk line, a circuit is completed for the line relay 56 of the main selector F over the two sides of the calling line in series. Relay 56, upon energizing, closes a circuit at armature 91 and its front contact for the slow acting release relay 57, which in turn energizes to prepare a circuit for the vertical magnet and to place ground on conductor 36 at armature 93 and its front contact. This ground extends over the release trunk conductor 36 through the winding of relay 34 to battery. The latter relay, on energizing, places ground on the multipled release trunk in the banks of local selector switches in which this incoming trunk is accessible.

Now, when the calling device of the calling subscriber is operated to open the line circuit a number of times in accordance with a digit of the called number, the line relay of the selector repeater will produce a corresponding series of interruptions in the circuit of the line relay 56 of the main selector F. Upon each retraction of its armature the line relay 56 closes a circuit extending from ground $G^{11}$, by way of armature 91 and its back contact, conductor 137, armature 220 and its resting contact, conductor 146, armature 104 and its back contact, armature 94 and its front contact, through the winding of the slow acting relay 58, conductor 139, back contact and armature 215, conductor 141, armature 155 and its back contact, back contact and armature 89, and thence through the winding of the vertical magnet 64 to battery. Relay 58 energizes in series with the vertical magnet, and being a slow acting relay, maintains its armature attracted during the operation of the switch. Magnet 64 operates to raise the wipers 112–115, inclusive, step by step until they are placed opposite some level of bank contacts, in which are terminated trunk lines leading to the branch exchange second selector switches.

As soon as the wipers leave their normal position the spring 119 is shifted into engagement with its front contact thereby completing a circuit for magnet 67. The operation of this magnet may readily be seen by referring to Fig. 10. Upon attracting its armature 201′, magnet 67 shifts the off normal springs 116, 117 and 118, etc., into their alternate positions where they are mechanically locked by the spring 200′. When the shaft of the switch is released the pin 202′ mounted thereon withdraws the spring 200′ thereby allowing the off normal springs to return to their original position.

To continue, when the off normal springs are operated a circuit is completed extending from ground $G^3$, through armature 93 and its front contact, armature 96 and its front contact, armature 87 and its back contact, armature 159 and its resting contact, off normal springs 116, and thence through the winding of the interrupter relay 59 to battery. Relay 59 energizes to prepare the rotary magnet circuit at armature 100 and locks itself to ground at armature 99. The slow acting relay 58 falls back an instant after the impulses to the vertical magnet have ceased. When this occurs a circuit is completed for the rotary magnet 65 extending from ground $G^3$, by way of armature 93 and its front contact, armature 96 and its back contact, armature 100 and front contact, and through the winding of the rotary magnet 65 to battery. Magnet 65 operates to rotate the wipers 112 to 115, inclusive, into engagement with the first set of contacts in the selected level and at the same time opens the locking circuit of relay 59 which deenergizes, breaking the circuit of the rotary magnet which deenergizes also. When magnet 65 denergizes it prepares a new circuit for the interrupter relay 59 extending from the test wiper 112, through armature 88 and its resting contact, back contact and armature 160, armature 159 and its back contact, off normal springs 116, and thence through the winding of relay 59 to battery. Now, if the first trunk line of this level, on the test contact of which the wiper 112 now rests, is busy a ground potential will be present thereon and relay 59 will energize over the above traced circuit. On energizing, relay 59 operates as before to close the rotary magnet circuit. Magnet 65 operates to advance the switch wipers into engagement with the set of bank contacts associated with the next trunk line and to again break the circuit of the interrupter relay, which relay on deenergizing breaks the rotary magnet circuit. This alternate operation of relay 59 and magnet 65 continues until an idle trunk line is found which, it will be assumed, is the trunk line comprising the conductors 250 to 253, inclusive, and which terminates in the selector H, Fig. 5. When the switch wipers are rotated into engagement with this trunk line no ground will be present on the test contact engaged by the wiper 112 and relay 59 will not be again energized to close the rotary magnet circuit. It will be noticed that during the rotation of the switch in search of an idle trunk line the switching relay 55 was short circuited by ground on the successive busy test contacts through wiper 112, now, however, when an idle trunk line is reached, the relay 55 is no longer short circuited and hence it will energize over a circuit extending from ground $G^3$, through armature 93 and its front contact, through the winding of relay 55, back contact and armature 160, armature 159 and its back contact, off normal springs 116, and thence through the winding of relay 59 to battery. Relay 55 is of comparatively high resistance and does not permit the relay 59 to operatively energize in series with it. Upon energizing, relay 55 opens the vertical magnet circuit at armature 89, connects ground to the wiper 112 at armature 88, prepares the circuit of the wiper cut on relay 63 at armature 86, and completes a repeating circuit at armature 90. This repeating circuit extends from ground $G^{11}$, by way of armature 92 and its front contact, armature 77 and its back contact, back contact and armature 72, conductor 127, armature 194 and its back contact, back contact and armature 199, conductor 121, front contact and armature 90, armature 158 and its back contact, through the winding of the slow acting series relay 61, wiper 113, bank contact 258, conductor 251, armature 300 and its resting contact, and through the winding of the line relay 301 of the selector H to battery. The line relay 301 energizes in series with relay 61 and said relays 301 and 61 actuate over this circuit and completes a circuit in the usual manner for the slow release relay 302. This relay on energizing prepares the vertical magnet circuit at armature 341 and its front contact. The actuation of relay 61 disables relay 63.

The calling main exchange subscriber may now operate his calling device in accordance with the next digit of the desired number. A series of interruptions is thereby produced in the circuit of the line relay 56 of the main selector F which relay operates and at each retraction of its armature 92 opens the previously traced circuit for the line relay 301 of the selector H. The latter relay at each deenergization sends a current impulse through the slow acting relay 304 and the vertical magnet 307 in series to battery. By the operation of the vertical magnet the selector shaft is raised step by step until the wipers 310–313, inclusive, stand opposite the desired lever of bank contacts. The slow acting relay 304 is energized in series with the vertical magnet, retains its armature attracted throughout the vertical movement of the switch, and upon the closure of the vertical off normal springs 314 and 315 completes a circuit for the interrupter relay 305. Upon energizing relay 305 prepares a circuit for the rotary magnet 308 at armature 317, and at armature 318 establishes a locking circuit for itself. At the end of the vertical operation of the switch the slow acting relay 304 is deenergized and closes the circuit of the rotary magnet, which is thereupon energized to advance the wipers 310–313, inclusive, into engagement with the first set of bank contacts in the level opposite which they were raised. The rotary magnet also breaks the circuit of the interrupter relay 305, which is accordingly deenergized to break the circuit of the rotary magnet, which thereupon deenergizes also and again closes its interrupter contact. The operation now depends upon whether the test contact with which the test wiper 310 is now in engagement is or is not busy. If this test contact is busy it will have a ground potential on it, and the interrupter relay 305 will be energized again over a circuit which extends from the said grounded test contact, by way of the test wiper 310, armature 320 and its back contact, the interrupter contact 322 of the rotary magnet, the off normal springs 314, and the winding of the interrupter relay 305 to battery. The interrupting relay will therefore energize to again close the circuit of the rotary magnet 308, which will operate to advance the switch wipers into engagement with the next set of bank contacts. This operation by which the interrupter relay and the rotary magnet are alternately energized and deenergized will continue as long as the test wiper 310 engages busy or grounded test contacts. In the present case it will be assumed that the trunk line shown in the drawings is the first idle trunk line and when therefore, the test wiper 310 arrives at test contact 325 and the rotary magnet is deenergized, the interrupter relay 305 will not be energized, but instead, the switching relay 306, which has hitherto been short circuited will be operated by current flowing over the following path: grounded conductor 250, winding of the switching relay 306, interrupter contact 322 of the rotary magnet, off normal springs 314, and the winding of the interrupter relay 305 to battery. Owing to the high resistance of the switching relay 306, the interrupter relay is not operated. Upon energizing, relay 306 disconnects the incoming dialing conductor 251 from the winding of the line relay 301 and extends it by way of armature 300 and its front contact, wiper 311, bank contact 326, conductor 328, armature 366 and its back contact, back contact and armature 361, and through the winding of line relay 350 to battery. The switching relay 306 on energizing, also extended the release trunk conductor 250 by way of front contact and armature 320, wiper 310, bank contact 325, conductor 327, and through the winding of relay 351 to battery. This latter relay energizes and prepares the circuit of the vertical magnet of the connector J.

It might have happened however, that all the trunk lines in the selected level were busy. Under these conditions the rotation of the switch H would continue until the springs 310 and 311 were closed which occurs on the eleventh rotary step of the switch, being operated by the cam on the switch shaft in a well known manner. These springs on operating, connect the dialing conductor 251 direct through the winding of the line relay 301 to battery and at the same time place a busy tone on the upper line conductor 252. This busy tone is audible to the calling subscriber over a circuit that extends over conductor 252, bank contact 256, wiper 114, armature 108 and its back contact, armature 85 and its front contact and thence over the line of the calling subscriber. Upon hearing this tone, the calling subscriber will replace his receiver on the switchhook knowing that for the present he is unable to obtain his desired connection. The replacement of the receiver at the calling substation initiates the release of the operated switches in a manner to be described hereinafter.

Returning now to the operation of the system after the trunk line comprising the conductors 328–330, inclusive, has been seized; the calling subscriber may now operate his calling device for the next digit of the called subscriber's number, thereby causing the line relay 56 to again operate in response to the said impulses and repeat them to the line relay 350 of the connector J. At each retraction of its armature 356, the line relay 350 completes a circuit for the vertical magnet 372 in series with the slow acting private control relay 352, which relay maintains its armature attracted during these impulses. Magnet 372 operates to raise the switch shaft step by step until the wipers 377–380, inclusive, stand opposite the desired level of bank contacts. On energizing, the slow acting relay 352 completes a circuit for the private magnet 371 at armature 358 in multiple with relay 353. The operation of relay 353 is at this time without function. The private magnet, however, controls the sideswitch in the usual manner, and upon the deenergization of the slow acting private control relay 352 permits the sideswitch wipers to advance to their second position.

The calling subscriber may now operate his calling device in accordance with the final digit in the called number, thereby producing a series of interruptions in the circuit of the line relay 56 which repeats them to the line relay 350 as before. Now, however, this latter relay transmits a corresponding number of impulses to the rotary magnet 373. The circuit being traced from ground $G^{15}$ by way of armature 356 and its back contact, armature 357 and its front contact, through the winding of the private control relay 352, armature 362 and its back contact, and through the winding of the rotary magnet 373, and sideswitch wiper in the second position to battery. By the operation of the rotary magnet, in response to the impulses of current which it receives, the switch shaft is rotated step by step, until the wipers 377–380, inclusive, are brought into engagement with the bank contacts in which the desired subscriber's line terminates, which in this case, it will be assumed, are the bank contacts 381–384, inclusive, in which the line of the subscriber at substation P is terminated. The relay 353 and the private magnet 371 are energized as before, and in case the called line is idle when the relay 352 deenergizes, the private magnet also deenergizes, and the sideswitch wipers are advanced to their third position.

It will first be assumed however, that the line of the substation P, when called as above described, was busy. Under these conditions there would be a ground potential on the test contacts 381 and 382 which are engaged by the test wipers 377 and 378 with the result that the private magnet 371 will not deenergize when the circuit is broken for its inner winding at armature 358 but is maintained operated over a test circuit extending as follows: ground on test contact 382, test wiper 378, sideswitch wiper in the second position, and through the outer winding of the private magnet 371 to battery. Also relay 354 is energized over the following circuit: grounded test contact 381, test wiper 377, spring 365, armature 359 and its back contact, through the winding of relay 354 and the sideswitch wiper in the second position to battery. On energizing, relay 354 closes a locking circuit for itself and the private magnet independent of the test wipers 377 and 378, this circuit extending from ground $G^{16}$, off normal springs 375, armature 364 and its front contacts, inner winding of the private magnet to battery and in multiple with this last traced circuit by way of armature 359 and its back contact, through the winding of relay 354 and the sideswitch wiper in the second position to battery. Relay 354 opens the rotary magnet circuit at armature 362, opens the circuit of the line relay 350 at armature 361, and places the tone from the busy machine $T^2$ on the upper heavy talking conductor 329. When the circuit of relay 350 is opened relay 61 in the main selector F, in series with the dialing circuit, deenergizes and completes the circuit for the wiper cut on relay 63. This circuit may be traced from ground $G^{12}$ by way of front contact and armature 86, armature 103 and its back contact, and through the winding of relay 63 to battery.

The busy tone is now placed on the tone of the calling subscriber by the operation of the relay 354 over a circuit which extends from the busy machine $T^2$ by way of armature 363, conductor 329, bank contact 323, and wiper 312, front contact and armature 321, conductor 252, bank contact 256, wiper 114, armature 108 and its front contact, armature 105 and its back contact and thence through the lower winding of the ring cut off relay 62 to battery. This operation will induce a current corresponding to the busy tone in the upper winding of ring cut off relay 62 from whence it flows over conductor 121′ through the lower winding of the back bridge relay 51, off normal springs 48, back contact and armature 69, through the condenser and thence over the lower line conductor to the substation A and back through the upper winding of relay 51 to battery. This tone will inform the calling subscriber at substation A that the line of the subscriber at substation P is for the time being, inaccessible, and he will replace his receiver. The disconnection of the various switches will be described hereinafter.

Having thus described the operation of the connector J when the called line is busy, it will now be assumed that when the connection therewith was attempted the line of the substation P was idle. Under these circumstances, when the slow acting relay 352 deenergizes at the end of the final series of impulses the private magnet 371 is deenergized also and the sideswitch passes to the third position. By the advance of the sideswitch wipers to their third position two circuits are closed in multiple. One extending from ground $G^{17}$, sideswitch wiper in the third position, through the test wiper 378, test contact 382, private normal conductor 385, springs 386, conductor 387, the winding of switching relay 407 of the lineswitch C′, and the winding of the stepping magnet to battery. In parallel with this circuit one is also closed for the busy lamp 452 thereby notifying an operator who has access to the line of the subscriber at substation P that this line is now busy. The current flow in this circuit serves to energize the switching relay 407, the stepping magnet remaining deenergized, and the line conductors 405 and 406 are thereby disconnected from their normal battery and ground connections in the lineswitch C′. It should be here mentioned that when relay 407 energizes as described above it is prevented from completely attracting its armatures by reason of a mechanical interlocking device controlled by the armature of the line relay 408 when in normal position. Ground at $G^{17}$, of course, also extends to multiples of test contacts 381 and 382 in other connector switches both incoming and local which have access to the line of the substation P in order to render this line busy. When the sideswitch steps to the third position another circuit is also completed in multiple with the above for the wiper cut on relay 355 in an obvious manner. On energizing, relay 355 prepares the ringing circuit at armatures 367 and 368, and at armature 366 opens the circuit of the line relay 350. As before, as soon as the circuit to the line relay 350 is broken the slow acting series relay 61 in the main selector F deenergizes. A circuit is thereby completed extending from ground $G^{12}$, front contact and armature 86, armature 103 and its back contact, and through the winding of the wiper cut on relay 63 to battery. Relay 61 on deenergizing, also breaks the circuit of the slow acting relay 60 which relay deenergizes a short interval afterwards. During this interval a distinctive tone from the tone machine T is placed on the calling subscriber's line conductor thereby notifying him that his call is proceeding satisfactorily. Relay 63 upon energizing, completes the ringing circuit for the called subscriber's telephone which extends from the ungrounded pole of generator V, over conductor 245, conductor 145, back contact and armature 107, armature 111 and its front contact, wiper 115, bank contact 257, conductor 253, armature 260 and its front contact, wiper 313, bank contact 324, conductor 330, armature 368 and its front contact, wiper 380, bank contact 384, line conductors 393 and 401 of the substation P, through the ringer and condenser of the said substation, line conductors 400 and 390, bank contact 383, wiper 379, front contact and armature 367, conductor 329, bank contact 323, wiper 312, front contact and armature 321, conductor 252, bank contact 256, wiper 114, armature 108 and its front contact, armature 105 and its resting contact, and thence through the lower winding of the ring cut off relay 62 to battery. This ringing current also causes an induced tone in the upper winding of the ring cut off relay which is audible to the calling subscriber, thereby notifying him that his call is proceeding satisfactorily. The ringing of the called substation P will continue intermittently in the ordinary manner until the subscriber thereat removes his receiver. When this occurs a circuit for direct current is completed over the previously traced ringing circuit through the switchhook springs, transmitter, and receiver of the called substation for the ring cut off relay 62, which, while it is adjusted not to respond to alternating current, will operate over this circuits. On energizing, relay 62 disconnects the ringing current from the called line at armature 107, at the same time connects the talking circuit to the windings of the back bridge relay 51 at armatures 105 and 107 and their front contacts, and locks itself energized at armature 106 and its front contact. A circuit is now completed extending from ground $G^{13}$ off normal springs 118 and its working contact, front contact and armature 106, conductor 121′, through the lower winding of the back bridge relay 51, working contact of off normal spring 48 and the said spring, front contact and armature 107, and then over the previously traced ringing circuit back to wiper 114, armature 108 and its front contact, armature 105 and its front contact, working contact of off normal spring 49 and the said spring, and through the upper winding of the back bridge relay 51 to battery. Relay 51 will therefore energize, completing a circuit extending from ground $G^4$ by way of armature 70 and its front contact, spring 117′ of key K′ and its resting contact, conductor 132, armature 200 and its resting contact, conductor 131, resting contact of spring 118′ and the said spring, and through the winding of the slow acting relay 52 to battery. Relay 52 will attract its armatures and at armature 73 complete the circuit of relay 53 and at armature 76 place ground on conductor 38 extending through the winding of relay 25 to battery. On energizing, this latter relay reverses the connections of the line relay 56 with regard to the trunk conductors 26 and 27 thereby reversing the battery back to the calling line for any desired purpose. The energization of relay 53 simply prepares the operating circuits of the auxiliary selector G. The calling and called subscribers may now converse over the heavy conductors in the usual manner.

When the conversation is completed the connection may be released by the hanging up of the receiver at the calling substation. Relay 56 will therefore deenergize opening the circuit of the slow acting release relay 57, which deenergizes also. This latter relay on deenergizing removes ground from the release trunk conductor 36 and at the same times closes a circuit for the release magnet extending from ground $G^8$ by way of armature 93 and its back contact off normal springs 117, and through the winding of the release magnet 66 to battery. The switch F will be immediately released by the energization of magnet 66 and as the holding circuit for the slow acting release relay 351 of the connector J and the switching relay 306 of the selector H has been opened by the deenergization of relay 57 each of these relays will accordingly deenergize. Relay 351 completes a circuit extending from ground $G^{20}$, by way of armature 399 and its back contact, off normal springs 374, and through the winding of the release magnet 369 to battery, and relay 306 completes a circuit extending from ground $G^{21}$, by way of armature 303 and its back contact, back contact and armature 340, armature 341, and its back contact, off normal springs 315, and then through the winding of the release magnet 342 to battery. Magnets 369 and 342 will operate to restore their respective switches to their normal position. Thus, in the above described manner all the switches will be restored to normal.

Let us now assume that the calling subscriber who has directed the extension of the previously described connection, desires to talk with some other subscriber in the branch exchange. In order to do this he will merely dial the local branch exchange number of that subscriber, thereby operating the auxiliary selector G to select an idle branch exchange second selector, after which the call will proceed in the ordinary manner.

This operation will now be described. When the calling device of the substation A is operated a series of interruptions is produced in the circuit of the line relay 56. At each retraction of its armature 91, a circuit is completed extending from ground $G^{11}$, by way of armature 91 and its back contact, conductor 137, armature 220 and its back contact, conductor 146, armature 104 and its resting contact, armature 94 and its front contact, armature 97 and its back contact, conductor 140, through the winding of slow acting series relay 171, armature 231 and its back contact, armature 211 and its back contact, and through the winding of the vertical magnet 177 to battery. It will be noticed that this circuit was also operative when the main selector was operated in the original connection but under these conditions the series relay 58 is adjusted to pull up first breaking the above traced circuit at armature 97, whereupon it was then ineffective. Relay 56 also completes another circuit at each retraction of its armature 92 extending from ground $G^{11}$ by way of armature 92 and its back contact, front contact and armature 95, conductor 138, and thence through the winding of slow acting relay 170 to battery. This relay energizes, and at armature 213 places ground on conductor 136, and at armature 212 and its front contact places ground on conductor 151, extending by way of armature 110 and its front contact, off normal springs 117, and through the winding of release magnet 66 to battery. Magnet 66 operates to lock itself to ground on conductor 136 at armature 157, to open the operating and repeating circuits of the main selector F and to restore the said switch to its normal position. The slow acting series relay 171 energizes in series with the vertical magnet 177 and opens the operating circuits of the main selector F at armature 215. Magnet 177 operates in the usual manner to step the wipers 235–238, inclusive, opposite some level of bank contacts in which trunk lines leading to selectors are terminated. Upon the wipers leaving their normal position the circuit of the off normal magnet 180 is completed and it operates to shift the springs 240, 241, 242, 245, and 246 into their off normal position in a similar manner to magnet 67. A circuit is thereby completed extending from ground $G^3$ by way of armature 93 and its front contact, conductor 36, conductor 123, armature 216 and its front contact, armature 234 and its back contact, off normal springs 240, and thence through the winding of relay 172 to battery. Relay 172 energizes over this circuit locks itself to ground at armature 218 and its front contact, by way of the interrupter springs 181 of the rotary magnet 178, and at armature 219 and its front contact prepares the rotary magnet circuit. The release magnet 66 of the main selector F remains energized until the slow acting relay 170 deenergizes at the end of the vertical movement of the switch G, having maintained the operating circuits of the main selector F open. After the impulses to the vertical magnet 177 cease, the circuit through the winding of relay 171 is open at back contact of armature 91, relay 171 therefore deenergizes after an instant and completes a circuit to the rotary magnet 178. Magnet 178 operates to step the wipers 235–238, inclusive, onto the first set of bank contacts in the selected level and also to open the locking circuit of the interrupter relay 172 which deenergizes and opens the circuit of the rotary magnet which deenergizes also. Now if the selector switch associated with the first set of bank contacts is busy a ground potential will be present on the test contact engaged by the test wiper 235. Then as soon as magnet 178 deenergizes the circuit of relay 172 will again be closed from ground by way of the said test wiper, armature 299 and its back contact, interrupter springs 181, and then over the previously traced circuit through the winding of relay 172 to battery. The relay 172 will again energize therefore to close the circuit of the rotary magnet at armature 219 and its front contact. The rotary magnet operates as before to step the wipers 235–238, inclusive, on to the next set of bank contacts and to open the locking circuit of relay 172 which deenergizes opening the rotary magnet circuit which deenergizes also. This alternate operation of relay 172 and the rotary magnet 178 continues until an idle trunk is found which we will assume, is the trunk line comprising conductors 262, 263, 264, and 265, the test contact 268 of which will be ungrounded and hence there will be no circuit for relay 172. The switching relay 169 which has hitherto been short circuited by the ground on the various test contacts will now be energized as there is no ground potential on the test contact of an idle trunk line. The circuit for the energization of relay 169 extends from ground on conductor 123 through the winding of relay 169, springs 181, thence over the previously traced circuit and through the winding of relay 172 to battery. Relay 169 is of such high resistance that it alone will energize over the above traced circuit thereby opening the vertical magnet circuit at armature 211, placing ground on the release trunk conductor 262 of the selected trunk line by way of armature 299 and wiper 235, and closing a repeating circuit for the line relay 350′ of the selected selector I. This circuit extending from ground $G^{11}$ by way of armature 92 and its front contact, armature 77 and its resting contact, back contact and armature 72, conductor 127, armature 194 and its back contact, back contact and armature 199, front contact and armature 210, armature 233 and its back contact, through the winding of slow acting series relay 173, wiper 236, bank contact 269, conductor 263, armature 355′ and its resting contact, and through the winding of the line relay 350′ of the selector I.

Relays 173 and 350′, will energize over the circuit, relay 173 completing the circuit of slow acting relay 174 at armature 221, and relay 350′ completing the circuit of the slow acting release relay 351′. The calling subscriber at substation A may now operate his calling device for the next digit of the desired number thereby producing a series of interruptions in the circuit of the line relay 56 of the main selector F which operates to repeat them to the line relay 350′ of the selector I over the previously traced circuit. The line relay 350′ responds thereto, to control the operation of the vertical magnet 356′ which operates to step the wipers 359′–362′, inclusive, opposite the desired level of bank contacts. The selector then rotates to find an idle trunk line in identically the same manner as the selector H operated, which operation was described fully hereinbefore. Upon an idle trunk being selected which, we will assume, is the trunk line comprising conductors 379′–382′, inclusive, the switching relay 354′ will energize in the usual manner in series with the interrupter relay 353′. On its energization, relay 354′ disconnects the incoming dialing conductor 263 from the winding of the line relay 350′ and extends it through armature 355′ and its front contact, wiper 360′, bank contact 376′, conductor 380′, armature 425′ and its resting contact, back contact and armature 426′ and then through the winding of the line relay 400′ of the connector K to battery. The switching relay 354′ also extends the release trunk conductor 262 by way of front contact and armature 357′, test wiper 359′, bank contact 375′, conductor 379′, and through the winding of the slow acting release relay 401′ to battery.

The calling subscriber may now operate his calling device for the last two digits of his desired number thereby causing the line relay 56 of the main selector D to repeat these impulses to the line relay 400′ of the connector K in the usual manner. The line relay 400′ controls the operation of the connector to connect with the desired line. If this line should happen to be busy then the private magnet 410′ will be maintained energized and the sideswitch locked in the second position. Relay 404′ will also energize placing the busy tone on the upper line conductor 381′ at armature 428′ and at armature 426′ opening the circuit to the line relay 400′ of the connector K. The busy tone is audible to the calling subscriber over a circuit similar to the one hereinbefore traced, and upon hearing this tone the calling subscriber will hang up thereby releasing the operated switches in a manner similar to that hereinbefore described.

Assuming now that the second called subscriber's line is idle, then as soon as relay 405′ energizes the dialing conductor is opened as before at armature 425′, and the ringing circuit is prepared at armatures 427′ and 429′. As before described, as soon as the circuit to the line relay 400′ is broken the slow acting series relay 173 deenergizes completing the circuit for the wiper cut on relay 176 and at the same time places the connector cut on tone in the calling subscriber's line for a short interval notifying him of the operation. Upon relay 176 energizing, the ringing circuit for the called subscriber is completed from the generator V and this current flows over a circuit similar to when the subscriber at substation P was signalled, through the ringer of called substation back through the lower winding of the ring cut off relay 175. When the subscriber answers the ring cut off relay energizes over the line circuit and operates to cut off the ring and complete the circuit of the back bridge relay 165 which also energizes over a circuit including the called subscriber's line loop. Upon energizing, relay 165 closes a circuit for the slow acting relay 166 which relay operates to prepare the operating circuits of the main selector F, completes the circuit of the slow acting relay 167 and also places ground on conductor 128 which extends through the winding of the reversing relay 25 to battery. This latter relay operates as before, to reverse the battery over the trunk line for any desirable purpose. Conversation may now be carried on between the two parties over the heavy line conductors. After this is terminated the connection may be released as before described by the calling subscriber replacing his receiver on the switchhook.

This passing of the call by the calling subscriber may be continued indefinitely as long as desirable each time releasing the called party in the connection upon the first digit of the next subscriber's number if the called party remains on the line. If however, the called subscriber hangs up first a circuit for the release magnet of the selector which is then in use is effective. Assuming the main selector F to be in use; when the called subscriber replaces his receiver on the switchhook the circuit of the back bridge relay 51 is opened which relay deenergizes sending an impulse of current at armature 70 to the slow acting relay 54 which energizes. A circuit is now effective extending from ground $G^{19}$, off normal spring 242 and its resting contact, conductor 148, front contact and armature 82, armature 74 and its back contact, off normal springs 117, and through the winding of release magnet 66 to battery. Magnet 66 operates, opening the operating circuits of the main selector as before, and restores the switch F to normal. Now, if the calling subscriber should pass the call he will operate the main selector F again as in the case first described, all the apparatus being now in its original position.

It will now be assumed that the second called subscriber called through element G finds that it is necessary to call another subscriber for the calling party. Under these conditions the second called party will operate his calling device for the local subscriber's number producing a number of series of interruptions in the circuit of the back bridge relay 165. When the second called subscriber operates his calling device for the first digit of the local number the back bridge relay 165 responds to the interruptions in its line circuit and at each retraction of its armature 193 completes a circuit as follows: from ground $G^{14}$ by way of armature 193 and its back contact, armature 202 and its front contact, conductor 133, through the winding of the slow acting series relay 58, conductor 139, back contact and armature 215, conductor 141, armature 155 and its back contact, back contact and armature 89, and through the winding of the vertical magnet 64 to battery. The slow acting relay 168 energizes in multiple with the above traced circuit but at this time its operation will have no effect. Relay 185 also energizes in parallel with the relay 168 and being a slow acting relay, maintains its armature attracted throughout each series of impulses serving to open the circuit to the line of the calling subscriber thereby preventing the dial impulses from causing him any annoyance. The slow acting series relay 58 also energizes in series with the vertical magnet circuit and maintains its armature attracted thoughout the vertical movement of the switch. Magnet 64 operates as before, to step the wipers 112–115, inclusive, opposite some level of bank contacts in which terminate trunk lines leading to selector switches. As before described, upon the wipers leaving their normal position the off normal springs operate and a circuit is completed for the interrupter relay 59, which energizes, establishes a locking circuit for itself, and prepares the rotary magnet circuit. At the end of the vertical movement of the switch, relay 58 deenergizes completing the circuit of the rotary magnet 65 which operates to open the locking circuit of the interrupter relay 59 and to rotate the wipers 112–115, inclusive, into engagement with the first set of bank contacts in the selected level. The interrupter relay, of course, deenergizes, breaking the circuit of the rotary magnet which also deenergizes. The trunk selecting operation will go forward in the manner previously explained until a trunk is found terminating in an idle selector switch which it will be assumed is the trunk line comprising the conductors 250, 251, 252, and 253. When the switching relay energizes, upon an idle trunk line being found, a repeating circuit is completed extending as follows: ground $G^{11}$, armature 92 and its front contact, armature 77 and its back contact, back contact and armature 72, conductor 127, armature 194 and its front contact, front contact and armature 199, conductor 121, front contact and armature 90, armature 158 and its back contact, through the winding of the slow acting relay 61, wiper 113, bank contact 258, conductor 251, armature 300 and its back contact, and thence through the winding of the line relay 301 of the selector H. The operation of this selector and the connector operated in response to the succeeding digits of a third called subscriber's number will, of course, be identical with that hereinbefore described. Should the second called party discover that he made an error in calling one of his numbers before sending the last digit or during its transmission he may replace his receiver on the switchhook thereby breaking the circuit of the back bridge relay 165 which deenergizes. A circuit is then completed extending from ground $G^{13}$, off normal spring 118 and its working contact, armature 109 and its back contact, conductor 150, armature 203 and its front contact, back contact and armature 196, conductor 130, off normal springs 117, and through the winding of the release magnet 66 to battery. Magnet 66 operates in the usual manner to restore the main selector to normal after which the succeeding switches will be restored by their respective release magnets.

However, if the second called subscriber completes the connection to the third called subscriber's line and should then desire to release in case the line is busy or the party called don't answer he may do so by dialing the digit 1, thereby producing another interruption in the circuit of the back bridge relay 165 which operates to send an impulse of current to the slow acting relay 168 in the usual manner. A circuit is then effective extending as follows: from ground $G^{15}$ by way of armature 192 and its front contact, armature 205 and its front contact, conductor 151, armature 110 and its front contact, (relay 63 now being energized), off normal springs 117 and through the winding of the release magnet 66 to battery. Magnet 66 will operate and the switch F will then be restored to its normal position. The operated switches will then be restored to normal in a manner hereinbefore described.

It may sometimes happen under certain conditions that an impulse of current is sent to the vertical magnet of one of the dual switches. It will be assumed that an impulse of current has been sent to the vertical magnet of the main selector F. Under these conditions magnet 64 will operate stepping the shaft up one step thereby causing the springs 119 to operate and upon the deenergization of the slow acting series relay 58 a circuit is completed extending from ground $G^{22}$, spring 119 and its front contact, back contact and armature 98, off normal springs 117, and through the winding of the release magnet 66 to battery. Magnet 66 will operate and the switch F will be restored to normal. Therefore, even though the vertical magnet does operate one step the corresponding dual selector will be automatically restored to normal. It also follows that a subscriber who has connected over a trunk to the dual switches may by dialing digit 1 four times restore which ever one of the dual switches next to be used to its normal condition because if the said one of the switches is normal it will step to the first level and release four times responsive to the four digits. If in an operated position the selector then seized and thereafter a connector will be operated, and finally a circuit will be completed for the release magnet of the operated dual switch in response to the next digit over one of the release circuits herein described so the said selector and connector will also be restored. Any subsequent digits 1 sent after the restoration of the switches will operate the restored dual switch and thereupon restore it. That is, if four digits 1 are not required to link the connector to the called line terminals and restore it, the extra digits 1 sent will have no linking effect as the dual switch element will operate and release idly for each extra digit 1.

It will now be assumed that the second called subscriber after completing the setting up of the connection to a third party's line does not wish to hold the line until that party answers. He will therefore replace his receiver on the switchhook, the circuit of the back bridge relay 165 is thereby broken and on its deenergization sends an impulse of current to the slow acting relay 168. A circuit is now effective for release magnet 179 of the auxiliary selector G extending from ground $G^{18}$, through off normal spring 118 and its working contact, armature 109 and its front contact, conductor 149, armature 204 and its front contact, armature 197 and its back contact, off normal springs 241, and then through the winding of the release magnet 179 to battery. The magnet 179 will operate to restore the auxiliary selector G to normal after which the switches K and I that maintained the connection to the second called subscriber will be released by the operation of their respective release magnets. In the meantime the signalling of the third called subscriber will be going on and upon an answer being obtained conversation between the original calling and third called parties may take place over the same switches that were operated in the first case described. After the conversation is terminated the release will take place in the usual manner upon the subscribers replacing their receivers upon the switchhooks.

This third called subscriber may pass the call to a fourth subscriber in a manner similar to that above described except that the back bridge relay 51 will be operated in response to the various digits to control the operations of the auxiliary selector and the succeeding switches.

It will thus be seen that this passing of a call by either the calling or called subscriber may go on indefinitely and in each case only the two subscribers are in communication at once. It may be desirable however to arrange this system so that the three subscribers may remain on the connection for a conference, in this case the key K′ associated with the dual switches is operated by some person say the exchange attendant. Now when the call is passed by a called subscriber the three parties may remain in on the connection. The operation of the system in this case will now be briefly described.

For the purposes of this description it will be assumed that a calling main exchange subscriber at substation A has called a branch exchange subscriber at substation P by means of the main selector F and the succeeding switches in a manner similar to that hereinbefore explained, and that the subscriber thereat has responded and has extended the connection to the line of another branch exchange subscriber such as the one at substation O through the medium of the auxiliary selector G and the switches I and K. The subscriber at the substation O will be rung in the ordinary manner and that subscriber upon removing his receiver from the switchhook will stop the ringing operation and complete the circuit of the back bridge relay 165 as described hereinbefore. Upon energizing, relay 165 will close the circuit of the slow acting relay 166 through the key spring 120 and its working contact and hence the release circuit through the contacts of the slow acting relay 52 is ineffective. The three parties may now converse as long as desired. If at any time one of the branch exchange subscribers, the one at substation P for example, should desire to talk to the calling subscriber alone he will simply operate his calling device for the digit 1, thereby producing one interruption in the circuit of his back bridge relay 51. Upon the retraction of armature 70, slow-releasing relay 54 will actuate, so when armature 71 retracts a circuit may be traced from ground $G^5$ by way of armature 71 and its front contact, armature 84 and its front contact, conductor 135, armature 229 and its front contact, off normal spring 241, and thence through the winding of the release magnet 179 to battery. Magnet 179 operates to restore the auxiliary selector G to normal after which the selector I and connector K will be released. It will be seen that the subscriber at substation O could have released the subscriber at substation P in a similar manner by dialing 1. This circuit would extend from ground $G^{15}$, by way of armature 192 and its front contact, armature 205 and its front contact, conductor 151, armature 110 and its front contact, off normal springs 117 and thence through the winding of the release magnet 66 to battery. In this manner the system may be arranged so that the three subscribers may remain on the connection and at the same time providing means so that if it becomes necessary or desirable for one of the parties to converse secretly with the party calling over the trunk from the main exchange the third may be released. It will be seen that any digit might be dialed in place of 1 to release for the reason that the operated switch will release upon the first impulse as above described and then the release magnet will lock up through its armatures opening the operating circuits of that switch. This locking circuit of the release magnet will be effective until all the impulses of the digit called to release have ceased for the reason that one slow acting series relay will be energized locking the release magnet in an obvious manner.

Under certain conditions it might be desirable to arrange groups of telephones under one number and if one of these were busy the other would be selected automatically. The connectors J and K have also been designed to serve this class of subscribers. To arrange the connector J to serve this class of subscribers the tie between the two test or private bank contacts such as 381 and 382 is omitted in all except the private contacts of the last telephone in the group. Now when this connector under the control of a calling subscriber attempts to connect with the first telephone in the group and this being busy, ground will only be present on the lower test contact. A circuit is now completed from the said grounded test contact by way of the test wiper 378, side-switch wiper in the second position and through the outer winding of the private magnet 371 to battery. This circuit maintains the private magnet energized after the slow acting relay 352 falls back. A circuit is then completed extending from ground $G^{26}$ by way of armature 358 and its back contact, armature 360 and its back contact, armature 366 and its front contact, armature 362 and its back contact, and then through the winding of the rotary magnet 373 to battery. The rotary magnet operates to advance the wipers 377–380, inclusive, one step and at the same time closes the circuit of the interrupter relay 353 which on energizing breaks the circuit of the rotary magnet which then deenergizes. If the line upon which the wipers now rest is busy also, the private magnet will be maintained energized and upon the interrupter relay deenergizing the rotary magnet circuit would be again completed. The alternate operation of the rotary magnet 373 and the interrupter relay 353 will continue until an idle line is found or until the test wipers 377 and 378 both engage test contacts which are tied together and also busy. In the latter case the busy relay 354 energizes and applies the busy tone to the line of the calling subscriber. In case this line happens to be idle the private magnet deenergizes and the side-switch steps to the third position. The operation in these cases have been fully described hereinbefore.

Let us now assume that after a connection has been extended from the main exchange subscriber at substation A to the branch exchange subscriber at substation P through the medium of the switches F, H, J in the branch exchange that the called subscriber at substation P should desire to call another branch exchange party without the knowledge of the calling subscriber. To meet these conditions a holding trunk has been provided the operation of which will now be described.

The called subscriber will now operate his calling device for the digit assigned to holding trunk, which in this case is the digit 2. Two interruptions are thereby produced in the circuit of the back bridge relay 51. This relay operates in response thereto and sends two impulses of current to the vertical magnet 177 of the auxiliary selector G in series with the slow acting relay 171 which relay maintains its armature attracted throughout the vertical movement of the switch. Magnet 177 operates to step the wipers 235–238, inclusive, opposite the second level of bank contacts. Upon the first vertical movement of the wipers the off normal springs are operated and a circuit is then completed for the interrupter relay 172 which energizes and locks, and at the same time prepares the rotary magnet circuit. When the vertical movement of the switch ceases relay 171 deenergizes completing the circuit of the rotary magnet 178. Magnet 178 energizes advancing the wipers onto the first set of back contacts in the selected level, and breaking the circuit of the interrupter relay 172. Relay 172 deenergizes opening the rotary magnet circuit which also deenergizes. If this holding trunk, which terminates in the first set of bank contacts in the selected level, should happen to be busy at this time, a ground will be present on the bank contact 270 engaged by the test wiper 235. Under these conditions the interrupter relay will again energize over a circuit including the said grounded test contact, and complete the circuit of the rotary magnet, magnet 178 will operate as before to advance the wipers onto the next set of bank contacts. The test contact of this set will also be grounded as there is but one holding trunk in the exchange. If more than one holding trunk was needed in this case, it would be necessary to use another level of bank contacts in the dual selector. As there is only one holding trunk in this level all the test contacts except the first and last will be permanently grounded. Therefore, the rotary magnet 178 will continue to operate rotating the wipers step by step until the test wiper 235 reaches the tenth contact in this level. This test contact is connected through a resistance to battery. The switching relay 169 will therefore energize and as the repeating circuit is closed to battery B′ the relay 173 will therefore energize opening the circuit of the wiper cut on relay 176 at armature 221. A tone will be given to the calling subscriber over a circuit extending from the tone machine T′ over conductor 280, bank contact 281, wiper 237, armature 227 and its back contact, front contact and armature 207, and then over the upper heavy talking conductor to the calling subscriber's line. This tone will also be audible to the first called party who upon hearing this tone will know that the holding trunk is for the present inaccessible and will hang up his receiver releasing the auxiliary selector G in a manner hereinbefore described. The first called party by again removing his receiver will be in communication with the original calling party and he may again attempt to connect to the holding trunk if he so desires.

In a like manner the tenth rotary contacts on all levels of the dual switches are left open and if all the other trunks in a level are busy the switch will rotate onto the tenth contact where it will stop, giving a distinctive tone to the calling subscriber in the same manner as described.

It will now be assumed that the holding trunk was idle when the subscriber at substation P attempted to connect with it. Under these circumstances the switching relay 169 will energize in series with the interrupter relay 172 after the first rotary step of the switch as there is no ground present on the test contact 270 engaged by the test wiper 235 the holding trunk now being idle. Upon energizing, relay 169 closes a circuit extending from ground by way of armature 208 and its front contact, armature 221 and its back contact, and then through the winding of the relay 176 to battery. The wiper cut on relay 176 energizes and prepares a talking circuit. As the branch exchange calling party hears no busy tone he will know that he has connected the calling subscriber to the holding trunk and he will replace his receiver thus releasing the main selector F and the switches H and J in a manner hereinbefore described (as at this time the wiper cup on relay 176 is energized).

Having successfully connected the calling subscriber to the holding trunk the first called party at substation P may then call his desired local number which operation will now be described. Upon the subscriber at substation P removing his receiver preparatory to making a call a circuit is completed for the line relay 408 over the line conductors 401 and 402 in series. The line relay 408 is energized over this circuit and upon attracting its armatures completes a circuit extending through the switching relay 407 and the stepping magnet 409 in series at its armature 410, and at its armature 411 connects the test wiper 418 to the above circuit at a point midway between the switching relay and the said stepping magnet. The operation now depends upon whether the test contact with which the wiper 418 is in engagement is busy or idle. If this test contact is busy it will have a ground potential upon it, the switching relay 407 will be short circuited, and the stepping magnet 409, which interrupts its own circuit being supplied with direct ground by way of the test wiper 418 will operate like a buzzer to advance the wipers 415–418, inclusive, step by step in search of an idle trunk line. This operation will continue as long as the test wiper 418 engages grounded or busy test contacts. However, we may assume when a call is initiated, the selector D′ is idle and the test contact 422 thereof is not grounded. Under these circumstances, when the line relay 408 is energized, the switching relay 407 is energized immediately afterwards, with the result that the line conductors 406 and 405 are disconnected from the winding of the line relay 408, and from ground, respectively, and are extended by means of armatures 412 and 413, wipers 416 and 417, bank contacts 420 and 421, armatures 425 and 426 and their resting contacts to the upper and lower windings of the line relay 430 of the selector D′.

Immediately upon the extension of the line as above described the line relay 430 will be energized over the line circuit and will close the circuit of the slow acting release relay 431. Upon energizing, relay 431 prepares the circuits of the switch for the vertical operation in the usual manner, and at armature 435 completes a holding circuit extending back to the lineswitch C′ over the following path: ground $G^{35}$, through front contact of armature 435 and the said armature, conductor 440, test contact 422, test wiper 418, armature 414 and its front contact, winding of the switching relay 417, and the winding of the stepping magnet 409 to battery. A branch of this circuit also extends over conductor 387 to the busy lamp 452 which glows notifying the operator who has access to this line that it is busy. This circuit also extends to the multiply connected test contacts in connector switches which have access to the line of the subscriber at substation P thereby protecting it from intrusion in a well known manner. It will be understood that the above circuit for the switching relay 407 is established before the slow acting line relay 408 has had time to deactuate.

The calling subscriber may now operate his calling device in accordance with the first digit of the desired number. A series of interruptions in the circuit of the line relay 430 is thereby produced, causing its armature to retract a corresponding number of times each time sending a current impulse through the slow acting relay 432 and the vertical magnet 455 in series to battery. By the operation of the vertical magnet the selector shaft is raised step by step until the wipers 436–439, inclusive, stand opposite the desired level of bank contacts. The slow acting relay 432 is energized in series with the vertical magnet retaining its armature attracted throughout the vertical movement of the switch, and upon the closure of the vertical off normal springs 458, completes a circuit for the interrupter relay 433. Upon energizing, relay 433 prepares a circuit for the rotary magnet 456 at armature 441, and at armature 442 establishes a locking circuit for itself. At the end of the vertical operation of the switch the slow acting relay 432 is deenergized and closes the circuit of the rotary magnet, which is thereupon energized to advance the wipers 436–439, inclusive, into engagement with the first set of bank contacts in the level opposite which they were raised. The rotary magnet upon operating, also breaks the circuit of the interrupter relay 433, which accordingly is deenergized to break the circuit of the rotary magnet, which thereupon deenergizes also and again closes its interrupter contact. The operation now depends upon whether the test contact with which the test wiper 436 is in engagement is or is not busy. If this test contact is busy it will have a ground potential on it, and the interrupter relay 433 will be energized again over a circuit which extends from the said grounded test contact by way of the test wiper 436, armature 443 and its back contact, the interrupter contact of the rotary magnet, the off normal springs 458, and the winding of the interrupter relay 433 to battery. The stepping relay will therefore operate to again close the circuit of the rotary magnet 456, which will operate to advance the switch wipers into engagement with the next set of bank contacts at the same time breaking the circuit of the interrupter relay 433 which deenergizes opening the circuit of the rotary magnet which then deenergizes also. This operation by which the interrupter relay and the rotary magnet are alternately energized and deenergized will continue as long as the test wiper 436 engages busy or grounded test contacts. In the present case it will be assumed that the trunk line comprising conductors 468–470, inclusive, is the first idle trunk line. Therefore, when the test wiper 436 arrives at the test contact 465 and the rotary magnet is deenergized, the interrupter relay 433 will not again be energized, but instead the switching relay 429, which hitherto has been short circuited, will be operated by current flowing over the following path: grounded conductor 440, winding of the switching relay 429, interrupter contact of the rotary magnet, off normal springs 458, and through the winding of the stepping relay 433 to battery. Owing to the high resistance of the switching relay 429, the stepping relay 433 is not operated. Upon energizing, relay 429 disconnects the incoming line conductors from the windings of the line relay 430, and extends them by way of armatures 425 and 426 and their front contacts, wipers 438 and 439, bank contacts 466 and 467, conductors 469 and 470, armatures 472 and 473, to the upper and lower windings of the line relay 475 of the second selector $D^2$.

The line relay 475 is energized over this circuit and closes a circuit for the slow acting release relay 476. Upon energizing, relay 476 prepares the vertical magnet circuit of the selector $D^2$, and closes a holding circuit extending back to the selector D′ which may be traced as follows: ground at $G^{40}$, working contact of armature 484 and the said armature, conductor 468, test contact 465, test wiper 436, armature 443 and its working contact to conductor 440, where it joins the previously described holding circuit extending back to the line switch C′ and serves to maintain relays 429 and 407 energized.

When the calling subscriber operates his dialing device in accordance with the next digit in the desired number, a series of interruptions is produced in the circuit of the line relay 475, which accordingly deenergizes a corresponding number of times. At each retraction of its armature a current impulse is sent to the vertical magnet 479 in series with the slow acting relay 477. In a similar manner to that hereinbefore described the vertical magnet operates to step the wipers 485–487, inclusive, opposite the desired level of bank contacts. Upon the first vertical step of the switch the vertical off normal springs 482 close and a circuit is completed for the interrupter relay 478. On operating, relay 478 prepares the rotary magnet circuit and locks itself energized. At the end of the vertical movement of the switch the slow acting series relay 477 retracts its armature completing a circuit for the rotary magnet 480 which operates, advancing the wipers into engagement with the first set of bank contacts in the selected level and breaking the locking circuit of the interrupter relay 478. The interrupter relay on deenergizing, also breaks the circuit of the rotary magnet which deenergizes also. The selector will then operate in the usual manner to select an idle trunk line which, it will be assumed, is the trunk line comprising conductors 491, 492, and 493. Under these conditions a circuit will be completed for the switching relay 474 which will energize in series with the stepping or interrupter relay 478. On energizing, relay 474 disconnects the incoming line conductors 469 and 470, from the windings of the line relay 475 and extends them by means of armatures 473 and 472 and their front contacts, wipers 486 and 487, bank contacts 489 and 490, conductors 491 and 492 and then to the upper and lower winding of the line relay 495 of the connector H′, which immediately energizes over the line circuit and completes the circuit of the slow acting release relay 496. On energizing, relay 496 prepares the operating circuits of the connector H′ and completes a holding circuit which extends as follows: ground $G^{45}$ by way of armature 503 and its working contact, conductor 493, test contacts 488, test wiper 485, and armature 471 and its working contact, where it joins the previously traced holding circuit serving the maintaining switching relays 474, 429 and 407 energized.

When the calling subscriber dials the next digit in the desired number, a series of interruptions is produced in the circuit of the line relay 495, which accordingly deenergizes a corresponding number of times. At each deenergization the line relay transmits an impulse of current through the vertical magnet 505 over a circuit extending from ground $G^{46}$ by way of armature 504 and its back contact, through the winding of the slow acting series relay 497, and through the winding of the vertical magnet 505 and the sideswitch wiper in the first position to battery. By the operation of the vertical magnet 505 the switch shaft is raised step by step until the wipers 510–513, inclusive, stand opposite the desired level of bank contacts in which is located the set of contacts associated with the line of the desired called subscriber. The slow acting relay 497 is energized in series with the vertical magnet and maintains its armature attracted throughout the vertical movement of the switch thereby completing a circuit for the interrupter relay 498 and the private magnet 509 in multiple. The operation of relay 498 is at this time without function. The private magnet however controls the sideswitch in the usual manner, and upon deenergizing, following the deenergization of relay 497 at the end of the vertical movement of the switch, permits the sideswitch wipers to advance to their second position.

The calling subscriber may now operate his calling device in accordance with the final digit in the called number, such as the digit 2, (the line of substation O being connected to second set of contacts in the second level), thereby producing two interruptions in the circuit of the line relay 495 of the connector. The line relay operates to send an impulse of current over the following circuit: ground $G^{46}$ by way of armature 504 and its back contact, armature 507 and its front contact, winding of relay 497, armature 514 and its back contact, and through the winding of the rotary magnet 506 and the sideswitch wiper in the second position to battery. By the operation of the rotary magnet the switch shaft is rotated two steps and the wipers 510–513, inclusive, are brought into engagement with bank contacts 515–518, inclusive, comprising the contact set assigned to the subscriber O. The relay 498 and the private magnet are energized as before, and in case the called line is idle when the relay 497 deenergizes, the private magnet also deenergizes, and the sideswitch wipers are advanced to their third position.

If the line happened to be busy the sideswitch would be locked in the second position and the relay 499 would be energized over the subscriber's line. The operation of the connector H′ in this case would therefore be identical with that of the connector J which has been already described.

However, it will be assumed, that the line was idle when connection thereto was attempted. Upon the sideswitch wipers advancing to their third position a circuit is completed for the wiper cut on relay 502 in an obvious manner. Relay 502 on energizing, completes the ringing circuit for the called subscriber's telephone which circuit extends as follows: from the generator V′ by way of the back contact of armature 519 and the said armature, upper armature of relay 502 and its front contact, wiper 512, bank contact 517, line conductor 520, through the condenser and ringer of the called substation, line conductor 521, bank contact 518, wiper 513, front contact and armature 524, armature 525 and its resting contact, and through the lower winding of the ring cut off relay 500 to battery. Upon the subscriber at the substation O answering, the ring cut off relay 500 will energize, a path for direct current being now completed for it over the previously traced ringing circuit through the transmitter and receiver of the substation. On energizing, relay 500 cuts off the ring and completes the talking circuit. Conversation will now take place and upon its termination the switches will be released upon the calling subscriber replacing his receiver on the switchhook in the usual manner.

Having obtained the information desired the calling branch exchange subscriber may now connect himself with the original main subscriber which operation will now be described. Upon the subscriber at substation P removing his receiver, the lineswitch C′ individual to his line operates to select an idle selector in the usual manner which we will assume is the selector D′. The line relay 430 will energize over the line circuit and close the circuit of the slow acting release relay 431. This latter relay prepares the vertical magnet circuit and also completes the the usual holding circuit for the switching relay 407 of the lineswitch C′. The calling subscriber may now operate his calling device for the digit 2 thereby producing two interruptions in the circuit of the line relay 430. The selector D′ operates under the control of the line relay 430 in the usual manner stepping to the second level and rotating its wipers 436–439, inclusive, into engagement with the first set of bank contacts. These of course will be idle for the reason that as there is only one holding trunk in this level and the multiple of the test banks between the two groups of switches namely the incoming group and the local group is omitted though the test contacts of each group are multipled together, as is the line or rather the holding trunk contacts, these being also multipled into a set of contacts in the dual switches. As the test wiper 436 finds no ground on the test contact 465 the switching relay 429 will immediately energize in series with the interrupter or stepping relay 433. Upon the switching relay energizing, a circuit is closed for the ring cut off relay 175 of the auxiliary selector G over a circuit extending from generator V over conductor 245, back contact of armature 226 and the said armature, armature 230 and its front contact, wiper 238, bank contact 276, conductor 296, bank contact engaged by wiper 439 and the said wiper, front contact and armature 426, bank contact 421, wiper 417, front contact and armature 413, and thence over the subscriber's line through his switchhook springs transmitter and receiver, back over the other line conductor, armature 412 and its front contact, wiper 416, bank contact 420, armature 425 and its front contact, wiper 438 and the bank contact engaged thereby, conductor 295, bank contact 275, wiper 237, armature 227 and its front contact, armature 224 and its back contact, and through the lower winding of the ring cut off relay 175 to battery. Relay 175 will energize over this circuit locking itself energized at armature 225, and at armatures 224 and 226 completing the circuit of the back bridge relay 165 which energizes in the usual manner over the branch exchange subscriber's line loop. In the branch exchange first selector D′ is a low resistance slow acting relay 434 in the line circuit, this relay will therefore energize in series with the back bridge relay 165 and at its armature 435′ complete a holding circuit in an obvious manner for the switching relays 407 and 429 of the lineswitch C′ and first selector D′. It may also be noticed that path for talking current is provided around the said relay and hence its inclusion in the line circuit will have no appreciable effect on the transmission. The two subscribers at substations A and P may now converse over the heavy talking conductors and if it is again necessary to pass the call to another branch exchange subscriber this may be accomplished in the ordinary manner by the subscriber at substation P operating his calling device. By this operation a series of interruptions are produced in the circuit of the back bridge relay 165 which will then operate to control the operation of the main selector F and the switches H and J or similar switches in completing the connection to another party's line in the ordinary manner. It will thus be seen that the branch exchange subscriber at substation P has as complete a control of the dual switches when connected to the holding circuit as when he was one of the original called parties. Upon the subscriber at substation P hanging up his receiver after the connection is completed to a third called subscriber he will release the auxiliary selector G and the first selector D′ in the usual manner. During the time the calling main exchange subscriber is waiting on the holding circuit he may release at any time in the usual manner by replacing his receiver upon the switchhook.

Having described the manner of setting up a connection between a main exchange subscriber and several branch exchange parties a few special connections will now be explained, these being local to the branch exchange.

The local branch exchange is provided with a feature that is known as discriminating service. This is an arrangement whereby certain subscribers only are allowed to call through to the main exchange. In order to accomplish this result the individual lineswitch C′ is provided with a fourth wiper and connected thereto is a relay. A four conductor trunk to the first selectors is also provided the extra conductor of which terminates at the first selector in an auxiliary wiper. Let us now consider the case when the subscriber P desires to call a subscriber in the main exchange. If this subscriber is among those who are allowed outgoing service the relay 449 will be of quite high resistance. Supposing this is to be the case, upon the subscriber at substation P removing his receiver preparatory to making a call the lineswitch C′ operates in the usual manner to select an idle first selector which we will assume is the selector shown at D′.

Figure 2:
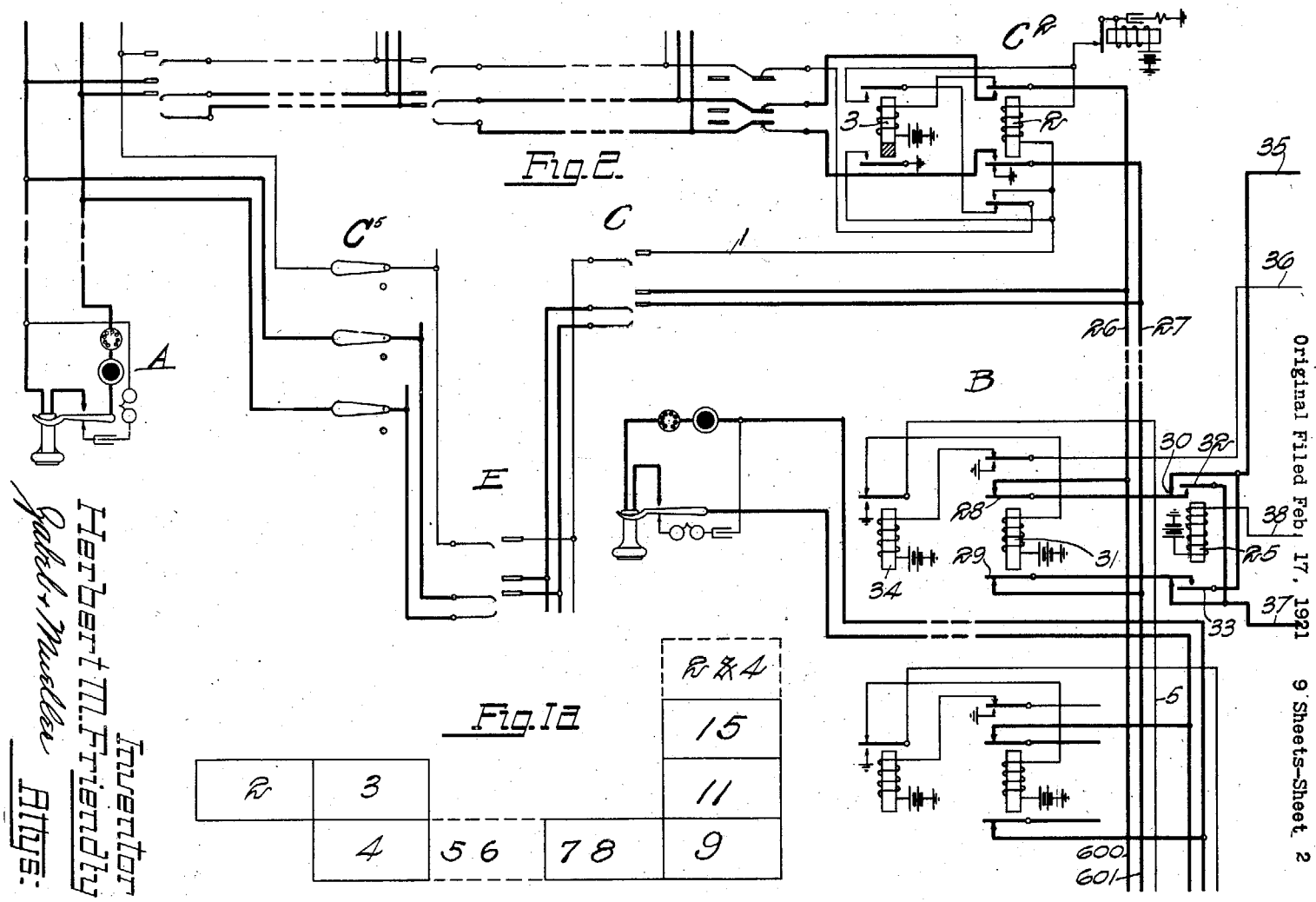
Figure 3:
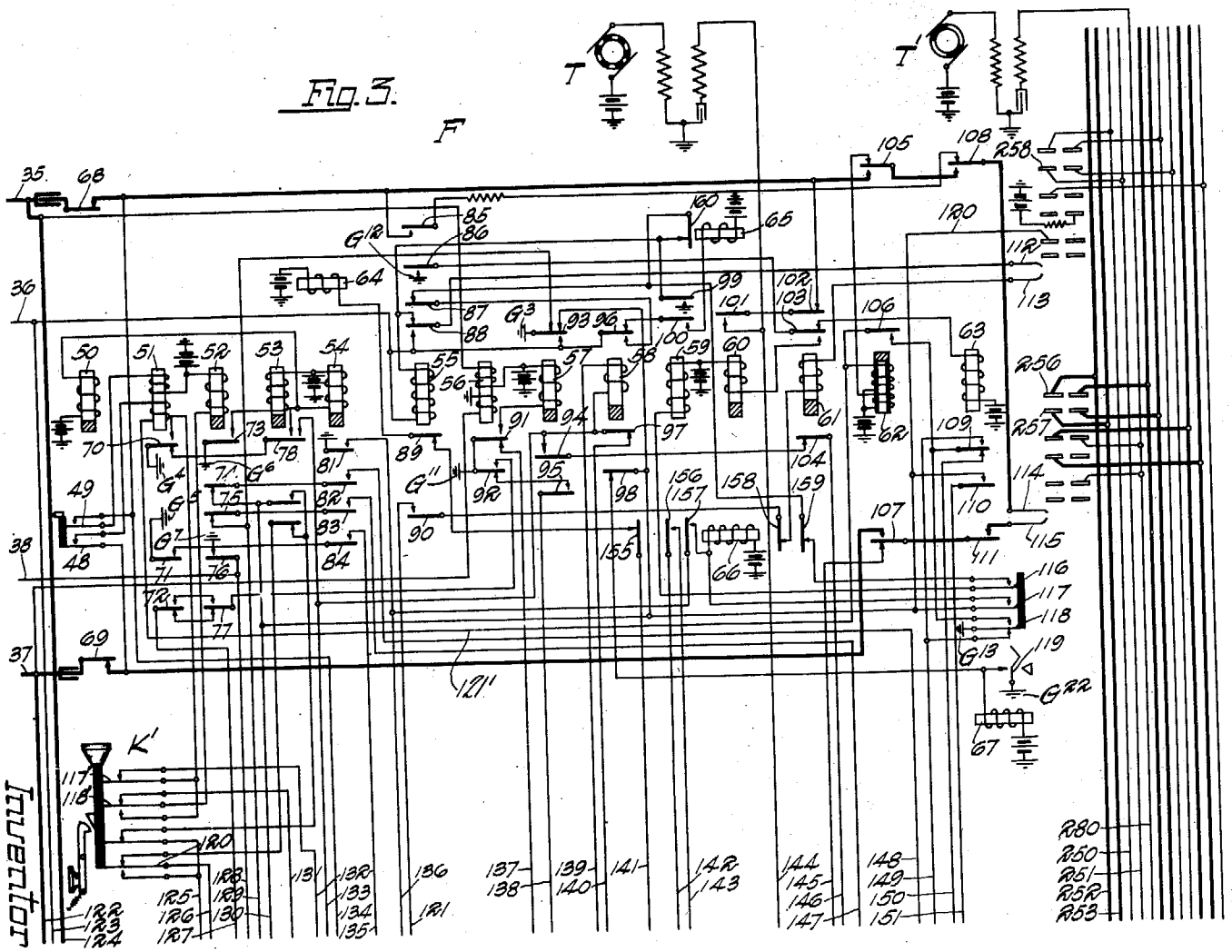
Figure 4:
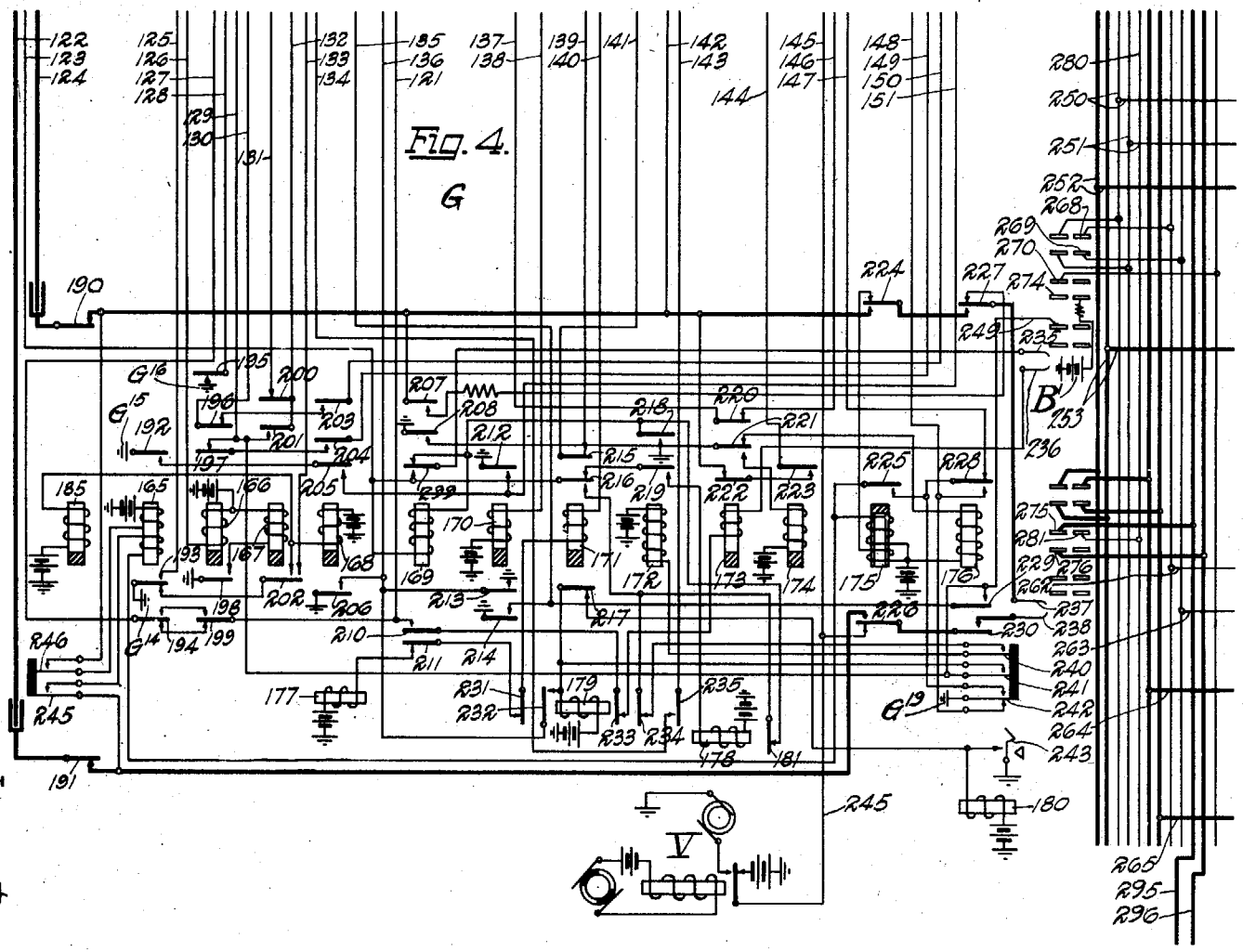

As the trunk lines going to the main exchange terminate in the tenth level of bank contacts the subscriber at substation P will now operate his calling device in accordance with this digit. It may also be noticed that the first selectors are provided with an extra test bank adapted to be engaged by the auxiliary wiper but as only the first and tenth levels are used in this case, the tenth being used for outgoing service, only, the contacts between the first and tenth levels of this auxiliary bank do not serve any purpose. The tenth level auxiliary bank is connected in the manner shown in Fig. 14 to a relay of relatively high resistance which is individual to one switch. Now upon the subscriber at substation P operating his calling device in accordance for the digit 0 ten interruptions are produced in the circuit of the line relay 430 which operates in response thereto controlling the operation of the vertical magnet 455 in stepping the wipers 436–439, inclusive, opposite the tenth level of bank contacts. The slow acting relay 432 energizes in series with the vertical magnet and upon the vertical motion of the switch ceasing deenergizes completing the circuit of the rotary magnet 456. The selector D′ then operates to select an idle trunk, in the usual manner, the test contact of which will be ungrounded. It will be seen that the relays 445 and 449 will be connected together by means of the auxiliary wiper 437 but these relays are so adjusted that one will not energize in series with the other so upon an idle trunk being found which we will assume is the trunk line comprising conductors 5, 600 and 601 the switching relay 429 will be energized in series with the interrupter relay 433. On energizing, the switching relay 429 extends the line conductors by means of armatures 425 and 426, wipers 438 and 439 and the bank contacts engaged thereby, conductors 600 and 601 (Fig. 2) thence over the trunk conductors 26 and 27 to ground and through the winding of the line relay 3 of lineswitch $C^2$ to battery. Ground is also extended over the test conductor 5 and through the winding of the cut off relay 31 to battery. Relay 31 energizes and disconnects the incoming trunk line from the dual selectors at armatures 28 and 29. As before, the slow acting relay 434 in the line circuit of the private automatic exchange first selector energizes and maintains it in an operated position. The lineswitch $C^2$ will operate to select an idle first selector in the main exchange after which the setting up of a connection to a main exchange subscriber will proceed in a well known manner.

Let us now consider the case when a restricted service branch exchange subscriber attempts to make an outgoing call. For this purpose it will be assumed that the subscriber at substation P is not allowed outgoing service. Under these conditions the relay 449 will be of low resistance to this case and hence will allow the relay 445 to energize in series with it but at the same time will not energize. Now upon a call being made the lineswitch C′ operates to select an idle selector in the usual manner which we will assume is the selector shown at D′. When the digit 0 is sent by the subscriber at substation P the selector D′ steps vertically to the tenth level and rotates one step carrying its wipers 436–439, inclusive, into engagement with the first set of contacts in the tenth level. A circuit is then completed for relay 445 from battery through the winding of relay 449, wiper 415, bank contact 419, wiper 437 and bank contact 476′ engaged thereby, and through the winding of relay 445 to ground. Relay 445, upon energizing, places direct ground on the test wiper 436 thereby causing the switch to rotate to the eleventh rotary position in the usual manner. Upon the eleventh rotary step the cam springs are shifted into their alternate position thereby stopping the rotation of the switch and giving the subscriber a busy tone from the tone machine $T^4$ thus informing him that he is not allowed outgoing service.

Certain subscribers in this branch exchange may have the special services of an operator if they so desire. The manner of connecting to an operator will now be explained. Let us assume that the subscriber at substation P wishes to call an operator. Upon removing his receiver the lineswitch C′ operates in the usual manner to find an idle selector which it will be assumed is the selector D′. To call the operator this subscriber will be instructed to operate his calling device for digit 1. The test contacts of this level are left open and hence the selector D′ steps to the first level and after the rotary magnet operates the switching relay will immediately energize and extend the line conductors 405 and 406 by way of armatures 425 and 426, wipers 438 and 439, through the upper and lower windings of the common bridged relay 475′. Relay 434 being included in the line circuit it will therefore energize completing the holding circuit of the selector D′ in an obvious manner. The relay 475′ is connected in multiple to all the line bank contacts in the first level of the selector switches in the same manner as shown in the selector D′. Upon the selector D′ rotating on the first level ground being connected to the auxiliary bank contacts of this level a circuit is completed from grounded contact 474′ by way of wiper 437, bank contact 419, wiper 415 and through the winding of relay 449 to battery. Relay 449 will energize over this circuit lighting the line lamp 451 before the attendant operator in an ordinary manner. Upon the operator noticing the lighted line lamp of the subscriber at substation P she will insert her plug (shown in Fig. 15) into the jack J thereby extending the subscriber's line to her head set. This cord circuit (Fig. 15) is of ordinary construction whose operation is well known and hence need not be described herein. By the insertion of the plug into the jack the line circuit of the selector is opened and upon the deenergization of relay 434 the first selector D′ will release in the ordinary manner. The subscriber at substation P may now converse with the operator and if a connection is desired with the line of another subscriber the operator may extend the line of this subscriber at substation P to the one desired by means of the cord circuit shown in Fig. 15 or a similar one in accordance with well known manual practice.

Having fully described and ascertained the features and operation of the invention what is considered to be new and desired to have protected by Letters Patent will be pointed out in the appended claims.

What I claim as my invention is:

1. In a telephone system, a calling station, means under the control of said calling station for extending a talking connection to a called station, means for then extending the connection to include a second called station, and means whereby either called station can thereafter disconnect the other from said connection with the calling station.

2. In a telephone system, calling and called stations, means under the control of said calling station for extending a connection to a called station and then to a second called station, thereby establishing a three party talking connection, and means under the control of either called station for thereafter releasing the other from said connection with the calling station.

3. In a telephone system, calling and called stations, means under the control of one of said calling stations for extending a talking connection to a called station, means under the control of said called station for extending the connection to a second called station, and means whereby either one of said called stations may thereafter release the other from said connection with the calling station.

4. In a telephone system, a trunk line, a pair of automatic switches associated with said trunk line, other automatic switches accessible to said pair of switches, means for seizing said trunk line and for operating one of said pair of switches to seize one of said second switches and for then operating the seized second switch to extend a connection to a called line, means for then operating the second switch of the pair over the called line to connect with a second called line, and means whereby the subscriber on either called line may release the other.

5. In a telephone system, calling and called stations, means under the control of one of said calling stations for extending the connection to a called station, means under the control of said called station for extending the connection to a second called station by sending digits, and means whereby said first called station may release the second called station while in a responded state by calling a particular digit.

6. In a telephone system, a calling station, means under the control of said calling station for extending a talking connection to a called station, means for then extending the connection to include a second called station, by sending digits, and means whereby said first called station may release the second called station while in a responded state by calling a particular digit.

7. In a telephone system, calling and called stations, means for sending digits under the control of one of said calling stations for extending a connection to a called station and then for sending digits from the called station to extend the connection to a second called station, thereby establishing a three party talking connection, and means whereby said first called station may release the second called station by calling a particular digit.

8. In a telephone system, calling and called stations, means for sending digits under the control of one of said calling stations for extending a talking connection to a called station, means for sending digits under the control of said called station for extending the connection to a second called station, and means whereby said second called station may release the said first called station by calling a particular digit.

9. In a telephone system, a calling station, means for sending digits under the control of said calling station for extending a talking connection to a called station, means for sending digits for then extending the connection to include a second called station, and means whereby the said second called station may release said first called station by calling a particular digit.

10. In a telephone system, calling and called stations, means for sending digits under the control of a calling station for extending a connection to a called station and then for sending digits from the called station to extend the connection to a second called station, thereby establishing a three party talking connection, and means whereby the said second called station may release said first called station by calling a particular digit.

11. In a telephone system, subscribers' lines, a pair of automatic switches, means whereby a subscriber on one of said lines may operate one of said switches to connect with a called subscriber's line, means for operating the other switch of said pair to extend the said connection to a second called subscriber's line, means for releasing said first extended connection upon the response of the subscriber on the second called line, a key, and circuit arrangements whereby when said key is operated the response of the subscriber on the second called line is ineffective to release said first established connection.

12. In a telephone system, subscribers' lines, a trunk line, a pair of automatic switches associated therewith, other automatic switches accessible to the switches of said pair, means for seizing said trunk line and for operating one of said pair of switches to seize one of said second switches, and for then operating the seized second switch to extend a connection to a called subscriber's line, means whereby the subscriber on the said called line may extend the connection to a third subscriber's line by means of the other switch of said pair, means for releasing said first extended connection upon the subscriber on the said second called line removing his receiver from the switch hook, a manually operated key, and circuit arrangements whereby when said key is operated the response of the subscriber on the said second called line is ineffective to release said first extended connection.

13. In a telephone system, subscribers' lines, a pair of automatic switches, means whereby a subscriber on one of said calling lines may operate one of said switches to connect with a called subscriber's line, means for operating the other switch of said pair to extend the said connection to a second called subscriber's line, means for releasing said first extended connection upon the response of the subscriber on the said second called line, a key, circuit arrangements whereby when said key is operated the response of the subscriber on the said second called line is ineffective to release said first established connection, and means whereby the subscriber on either called line can release the other from the connection.

14. In a telephone system, calling and called stations, means under the control of a calling station for establishing a connection with the called station through a series of automatic switches, means whereby the called station may disconnect therefrom by releasing a plurality of said automatic switches, means whereby the said called station can establish and release a new connection excluding the said calling station, and means whereby the said called station can reestablish connection with the said calling station before the latter has replaced his receiver.

15. In a telephone system, calling and called stations, means under the control of a calling station for establishing a connection with a called station through a series of automatic switches, means whereby the called station may disconnect therefrom by releasing one of said automatic switches, means whereby the said called station can establish and release a new connection excluding the said calling station, means whereby the said called station can then reestablish connection with the said calling station before the receiver of the latter has been replaced, and means whereby the reestablished connection may thereafter be extended to include another called station.

16. In a telephone system, calling and called subscribers' lines, automatic switches, means whereby a subscriber on one of said calling lines may operate a series of said automatic switches to establish a connection with a called subscriber's line, and relay means in an intermediate switch of said series operatively affective when the said connection has been so extended for notifying the subscriber on the said calling line that the connection is completed.

17. In a telephone system, calling and called stations, a trunk line, a pair of automatic switches associated therewith, other automatic switches accessible to the switches of said pair, means under the control of a calling subscriber for seizing said trunk line and operating one switch of said pair to seize one of said other switches, and for then operating said other switch to extend the connection to a called station, means whereby the called subscriber can operate the second switch of said pair and another one of said other switches to extend the connection to a second called station, and means in each of the switches of said pair for notifying the calling subscriber when the connection has been completed in each case.

18. In a telephone system, a trunk line comprising talking conductors, a pair of automatic switches individual to said trunk line, a back bridge in each switch for supplying talking current to called stations, said back bridges normally disconnected from said talking conductors, and means operative upon either switch of said pair being operated for connecting the back bridge of the operated switch to the talking conductors of said trunk line.

19. In a telephone system, a group of selector switches having bank contacts arranged in a plurality of levels, a group of trunk lines multiply connected to the bank contacts in a certain level, there being one contact set in said level not associated with a trunk line, means under the control of a calling subscriber for operating one of said switches to select and connect with an idle one of said trunks, a relay for last said switch, means for causing said switch to select and thereafter operate said relay to seize the said test contact when all of said trunks are busy, means for holding said switch in an operated position, and means for giving the calling subscriber a busy tone.

20. In a telephone system, a line, a subscriber's telephone thereon, a calling device at said telephone, said line extending through an operator's position and terminating in an automatic trunk selecting switch common to a plurality of lines including first said line, a line signal individual to said line at said operator's position, and means for actuating said signal in response to one operation of said calling device.

21. In a telephone system, a subscriber's line extending through an operator's position and terminating in an automatic trunk selecting switch common to a plurality of lines including first said line, a line signal individual to said line at the said operator's position, and means for actuating said signal in response to two successive acts of the subscriber on the said line which affect the line circuit.

22. In a telephone system, calling and called lines, automatic selector switches, trunk lines accessible to said selector switches terminating in connectors, means whereby a subscriber on one of said calling lines, may seize and operate a selector to connect with a trunk line terminating in a connector switch, a dialling conductor in said trunk, means under the control of the subscriber on the said calling line for sending impulses over said dialling conductor to control the operation of said connector switch in establishing a connection with a called line, and a relay operative responsive to the said connection being established for opening a point in said dialling conductor.

23. In a telephone system, calling and called lines, automatic selector switches, trunk lines accessible to said selector switches terminating in connectors, means whereby a subscriber on one of said calling lines may seize and operate a selector to connect with a trunk line terminating in a connector switch, a dialling conductor in said trunk means under the control of the subscriber on the said calling lines for sending impulses over said dialling conductor to control the operation of said connector switch in establishing a connection with a called line, a relay operative responsive to the said connection being established for opening a point in said dialling conductor in the connector, a relay in said seized selector switch, and means responsive to the opening of said dialling conductor for causing the operation of said last mentioned relay.

24. In a telephone system, calling and called lines, automatic selector switches, trunk lines accessible to said selector switches terminating in connectors, means whereby the subscriber on calling line may seize and operate a selector to connect with a trunk line terminating in a connector switch, a dialling conductor in said trunk, means under the control of the subscriber on the said calling line for sending impulses over said dialling conductor to control the operation of said connector switch in establishing a connection with a called line, a relay operative responsive to the said connection being established for opening a point in said dialling conductor, a relay in said seized selector switch, and means responsive to the opening of said dialling conductor for causing the operation of said last mentioned relay to close a point of the talking connection.

25. In a telephone system, calling and called lines, an impulse calling device on each said line, automatic switches under the control of a subscriber on one of said calling lines through the agency of its calling device for establishing a connection with a called line and means under the control of the subscriber on the said calling line for releasing said automatic switches by a further operation of the calling device at the calling substation of such character as would normally operate a said switch to perform a connective operation.

26. In a telephone system, calling and called lines, automatic switches, means under the control of a subscriber on one of said calling lines for establishing a talking connection with a called line by means of a series of said automatic switches, means under the control of the subscriber on the said called line for operating another series of automatic switches to extend the talking connection to a second one of said called lines, and means under the control of the subscriber on the first called line for releasing said last established connection by operating the calling device on the said called line.

27. In a telephone system, calling and called lines, automatic switches, means under the control of a subscriber on one of said calling lines for establishing a connection with a called line by means of a series of said automatic switches, a calling device on the calling line, means including said calling device under the control of the subscriber on the said called line for operating another series of automatic switches to extend the connection to a second one of said called lines, and means under the control of the subscriber on the first called line for releasing said last established connection by four successive operations of the calling device on the first called line.

28. In a telephone system, calling and called lines, a trunk line terminating in a pair of automatic switches, means under the control of a subscriber on one of said calling lines for seizing said trunk line and operating one switch of said pair to extend the connection in the direction of a called line, means under the control of the subscriber on the said calling line for operating the other switch of said pair to extend the connection to a second called line and means responsive to the operation of said second switch for releasing said first switch.

29. In a telephone system, calling and called lines, a trunk line terminating in a pair of automatic switches, a release magnet in each switch, an operating circuit for each switch, means under the control of a subscriber on one of said calling lines for seizing said trunk line and operating one switch of said pair to extend the connection to a called line, means under the control of the subscriber on the said calling line for operating the other switch of said pair to extend the connection to a second called line, means responsive to the operation of said second switch for releasing said first switch by energizing the said associated release magnet, and means controlled by the said release magnet for opening the operating circuit of the associated switch of said pair, and means for maintaining the said release magnet energized during the operation of the second switch of said pair.

30. In a telephone system, a calling line, automatic means for extending a connection to a called line, automatic means controlled from the called line for then extending connection to a second called line, and means whereby the first automatic means may be released under the control of the first called line after the connection is completed to the second called line and whereby the second automatic means may be released from said first called line before the completion of the connection to the said second called line.

31. In a telephone system, a calling line, a first automatic switch for extending a connection to a first called line, a second automatic switch controlled from the first called line for then extending the connection to a second called line, a release circuit for said first automatic switch whereby said first switch may be released under the control of said first called line after the connection is completed to said second called line, and a release circuit for said second automatic switch whereby said second switch may be released under the control of said first called line before the connection is completed to said second called line.

32. In a telephone system, a calling station, means for extending a talking connection from said calling station to a called station, means for then extending the connection to include a second called station and means whereby either called station can disconnect the other from the said connection.

33. In a telephone system, a calling station, automatic means for extending a talking connection to a called station, means for then extending the connection to include a second called station, and means whereby either called station can disconnect the other from the said connection.

34. In a telephone system, calling and called stations, means under the control of one of said calling stations for extending the connection to a called station, means under control of said called station for extending the connection from the calling station to a second called station by sending digits, and means whereby said first called station may release the second called station by calling a particular digit regardless of the condition of the second called station.

35. In a telephone system, calling and called stations, means for sending digits under the control of one of said calling stations for extending a connection to a called station and then for sending digits from the called station to extend the connection to a second called station, thereby establishing a three party Y talking connection, and means whereby said first called station may release the branch to the second called station by calling a particular digit.

36. In a telephone system, calling and called stations, means for sending digits under control of one of said calling stations for extending a talking connection to a called station, means under control of said called station for sending digits for extending the connection to a second called station to form a Y connection, and means whereby said second called station may release the said first called station from its calling station by sending a particular digit.

37. In a telephone system, a calling station, means for sending digits under control of said calling station for extending a talking connection to a called station, means for then extending the connection to include a second called station to form a Y talking connection, and means whereby the said second called station may be released under control of the first called station regardless of the condition of the second called station.

38. In a telephone system, a calling station, means for sending digits under control of said calling station for extending a talking connection to a called station, means for then extending the connection to include a second called station to form a Y connection, and means whereby the said second called station may release said first called station from the first said calling station by sending a particular digit.

39. In a telephone system, calling and called stations, means for sending digits under the control of a calling station for extending a connection to a called station and then sending digits from the called station to establish a connection to a second called station, thereby establishing a three party Y talking connection, and means whereby the said second called station may release said first called station from the first said calling station.

40. In a telephone system, calling and called stations, means for sending digits under the control of a calling station for extending a connection to a called station and then sending digits from the called station to establish a connection to a second called station, thereby establishing a three party Y talking connection, and means whereby the said second called station may release said first called station from the first said calling station by sending a particular digit.

41. In a telephone system, a line, a subscriber's telephone thereon, a calling device at said telephone, said line extending through an operator's position and terminating in an automatic trunk selecting switch common to a plurality of lines, a line signal individual to said line at said operator's position, and means for actuating said signal consequent to the primary operation of said switch responsive to an operation of the calling device.

42. In a telephone system, a calling line, automatic means for extending a connection to a called line, automatic means controlled from the called line for then extending a talking connection from the calling to a second called line to form a Y connection, and means whereby the first automatic means may be released under the control of the first called line after the connection is completed to the second called line and whereby the second automatic means may be released under control of the first called line from said first called line before the completion of the connection to the said second called line.

43. In a telephone system, a calling line, a first automatic switch for extending a connection to a first called line, a second automatic switch controlled from the first called line for then extending a talking connection from the calling to a second called line to form a Y connection between the said lines, a release circuit for said first automatic switch whereby said first switch may be released under the control of said first called line after the connection is completed to the said second called line, and a release circuit for said second automatic switch whereby said second switch may be released under the control of said first called line before the connection is completed to said second called line.

44. In a telephone system, a trunk line, a pair of automatic switches associated with said trunk line, other automatic switches accessible to said pair of switches, means for seizing said trunk line and for operating one of said pair of switches to seize one of said second switches and for then operating the seized second switch to extend a connection to another one of said second switches and for thereafter operating the last switch seized to extend a connecton to a called line, means for then operating the second switch of the pair over the called line to connect with a second line to form a three line Y connection, and means whereby the subscriber on either called line may release the other called line from the trunk line.

45. In a telephone system, calling and called stations, means for sending digits under the control of one of said calling stations for extending a connection to a called station and then for sending digits from the called station to extend the connection to include a second called station, thereby establishing a three party Y talking connection, and means whereby said second called station may release the first called station from the first said calling station by calling a particular digit.

46 In a telephone system, calling and called stations, means under the control of a calling station for establishing a connection with the called station through a series of automatic switches, means whereby the called station may disconnect therefrom by releasing a plurality of said automatic switches, means whereby the said called station can establish and release a new connection including the said calling station, means whereby the said called station can reestablish connection with the said calling station before the latter has replaced his receiver, and means whereby the reestablished connection can be thereafter extended to include another called station.

47. In a telephone system, a calling line, a selector switch, a group of fixed line terminals, a set of movable terminals of the switch for sweeping the line terminals by a hunting operation, an impulse relay of the switch connected to the calling line and operated thereover, a seizing relay of the switch for disconnecting the impulse relay and for completing the connective operation of the switch in extending the talking conductors of the calling line to the terminals of the first idle line tested, and means for operating the seizing relay while retaining the impulse relay connected responsive to all the terminals of the group being swept in the hunting operation.

48. In a telephone system, calling and called lines, means under control of the calling line for establishing a connection with the called line through a series of automatic switches, means whereby the called line may disconnect from the connection by releasing a plurality of said automatic switches, means whereby the said called line can establish and release a new connection excluding the said calling line, means whereby the said called line can reestablish connection with the said calling line before the latter has been restored to normal, and means whereby the reestablished connection can be thereafter extended to include another called line in a Y connection with the first said calling line and the first said called line.

49. In a telephone system, calling and called lines, means under control of the calling line for establishing a connection with the called line through an automatic switch, means whereby the called line may disconnect from the connection by releasing said switch, means whereby the said called line can establish and release a new connection excluding the said calling line, means whereby the said called line can reestablish connection with the said calling line before the latter has been restored to normal, and means whereby a new connection can be extended from the calling line to another called line under control of the called line before the first said calling line is restored.

50. In a telephone system, a group of selecting switches having bank contacts, a group of lines multiply connected to the bank contacts with respect to the corresponding contacts of the switches, means under control of a calling subscriber for operating one of said switches to select and connect with an idle one of said trunks, means to cause said switch to test all the trunks if all said trunks are busy, a relay operative to thereafter effect the seizure of the last said switch, means to cause the relay to operate, and means under control of the calling subscriber for maintaining the seizure of the switch.

51. In a telephone system, a group of selector switches, said switches having bank contacts, a group of lines multiply connected to the bank contacts with respect to the corresponding contacts of the switches, means under control of a calling subscriber for operating one of said switches to select and connect with an idle one of said trunks, means to cause said switch to test all the trunks if all said trunks are busy, a relay actuated to effect the seizure of the last said switch, and means including a pair of shaft cam springs adapted to close only after all the trunks have been tested and found busy to cause the relay to actuate and remain actuated, subject to becoming unseized under control of the calling subscriber.

52. In a telephone system, calling and called lines, automatic switches, means under control of a subscriber on one of said calling lines for establishing a connection with a calling line by means of a series of said automatic switches, means under control of a subscriber on the said called line for operating another series of automatic switches to extend the connection directly from the calling line to a second one of said called lines whereby to establish a three party Y talking connection, and means under the control of the subscriber on the first called line for releasing the last established connection by a single short opening of the first called line, and means for releasing the first called line by a prolonged opening of the first called line.

53. In a telephone system, calling and called lines, automatic switches, means under control of a subscriber on one of said calling lines for establishing a connection with a called line by means of a series of said automatic switches, means under control of a subscriber on the said called line for sending a plurality of digits for operating a plurality of automatic switches to extend the connection to a second one of said called lines whereby to establish a three party Y talking connection, and means under control of the subscriber on the first called line for releasing the last established connection consequent to sending an additional digit.

54. In a telephone system, a calling line leading to a switch having independently operable elements, means on the calling line to send impulses to operate a first one of said elements to extend a connection from the calling to a first called line, means whereby after the said called line is connected with the second one of said elements can be operated to extend a connection to a second called line by sending impulses over the calling line, and means whereby consequent upon the first impulse being sent after the first called line has been connected with the said first element will disconnect from its connected called line.

55. In a telephone system, calling and called lines, a trunk line terminating in a pair of automatic switches, a release magnet in each switch, an operating circuit for each switch, means under control of a subscriber on one of said calling lines for seizing said trunk line and operating one switch of said pair to extend the connection to a called line, means under the control of the subscriber on the said calling line for operating the other switch of said pair to extend the connection to a second called line, means responsive to the operat on of said second switch for releasing said first switch by energizing the said associated release magnet, and means controlled consequent to the operation of the release magnet for opening the operating circuit of the associated switch of said pair, and means for maintaining open said opened operating circuit during the operation of the second switch of said pair.

56. In a telephone system, a calling station, means for extending a talking connection from said calling station to a called station, means for then extending the connection to include a second called station in a Y connection, and means whereby either called station can disconnect the other from the said connection.

57. In a telephone system, a calling station, automatic means for extending a talking connection to a called station, means for then extending the connection to include a second called station in a Y connection, and means whereby either called station can disconnect the other from the said connection.

58. In a telephone system, an automatic switch, a moving connective member of said switch, circuits in said switch for controlling the operation of said member, contacts for altering the condition of said circuits, a passing contact set mechanically controlled momentarily by said connective member, a magnet for operating first said contacts, a pawl for locking the first said contacts operated, said pawl controlled by the connective member, and means whereby after the magnet operates the first said contacts consequent to the closure of the second said contacts the first said contacts will become mechanically retained by the pawl until the pawl is disengaged consequent to the moving member being restored.

59. In a telephone system, an automatic switch, a moving connective member of said switch, circuits in said switch for controlling the operation of said member, contacts for altering the condition of said circuits, a contact set mechanically controlled momentarily by said connective member, an electro-magnet controlled by second said contacts for operating first said contacts, a pawl for locking the first said contacts operated, said pawl controlled by the connective member, and means whereby after the electro-magnet operates the first said contacts will become mechanically retained by the pawl until the pawl is disengaged consequent to the moving member being restored.

60. In a telephone system, an automatic switch, a moving connective member of said switch, circuits in said switch for controlling the operation of said member, contacts for altering the condition of said circuits, a contact set mechanically controlled momentarily by said connective member, an electro-magnet controlled by second said contacts for operating first said contacts, a pawl for locking the first said contacts operated, said pawl controlled by the connective member, means whereby after the electro-magnet operates the first said contacts will become mechanically retained by the pawl until the pawl is disengaged consequent to the moving member being restored, and means for thereupon restoring the first said contacts.

61. In a telephone system, restricted and non-restricted calling lines, an automatic switch, a called group of lines selectively accessible from the switch, a first and a second tone source, means whereby a station on a non-restricted calling line can initiate a call and thereafter operate the switch to cause it to automatically test for and seize the first idle line of the group or automatically test all of the lines of the group if all of the lines of the group are busy and then automatically apply the first tone source to the calling line, and means whereby a station on a restricted calling line can initiate a call and thereafter operate the switch to cause it to idly automatically test over all of the group as busy regardless of their busy or idle state and then automatically apply the second tone source to the calling line.

62. In a telephone system, a trunk line comprising talking conductors, an automatic switch individual to said trunk line, a back bridge relay for the switch for supplying talking current to called stations, said back bridge normally disconnected from said talking conductors, and means operative responsive to the operation of the switch for connecting the back bridge relay to the talking conductors before a response is obtained from a called station connected by the operation of the switch.

63. In a telephone system, a trunk line comprising talking conductors, an automatic switch individual to said trunk line, a back bridge relay for the switch controlled in a series path with a called station for operating the switch over the called line, said back bridge normally disconnected from said talking conductors, and means operative responsive to the operation of the switch for connecting the back bridge relay to the talking conductors before a response is obtained from a called station connected by the operation of the switch.

64. In a telephone system, a calling line, a called line, a trunk line and terminating automatic switch for selecting the called line and thereafter completing a connection from the calling line to the called line, means for notifying the party on the calling line if the selected called line is busy and barred against connection, means for notifying the party on the calling line if the selected line is idle is connected with and signaling current is being normally applied thereover, and relay means antecedent to the trunk line for notifying the party on the calling line if the selected called line is idle and is connected with regardless of the normal application of signaling current thereover.

65. In a telephone system, a calling line, a called line, a train of automatic switches for extending a connection from the calling line to the called line, and automatically applied means in the final switch for operating a relay in an antecedent switch of the train for notifying the party on the calling line if the called line is idle regardless of any other condition thereof.

66. In a telephone system, a calling line, a called line, a train of automatic switches for extending a connection from the calling line to the called line, a tone source, and automatically applied means in the final switch for operating a relay in an antecedent switch of the train for applying the tone source audible to the party on the calling line only if the called line is idle.

67. In a telephone system, a calling line, a called line, a train of automatic switches for extending a connection from the calling line to the called line, a tone source, a pair of relays of an antecedent switch of the train, and automatically applied means in the final switch for successively operating the said relays to apply the tone source audible to the party on the calling line during the operating interval of the relays responsive to the called line being encountered idle.

68. In a telephone system, a calling line, a called line, a train of automatic switches for extending a connection from the calling line to the called line, a tone source, a pair of relays of an antecedent switch of the train, and automatically applied means in the final switch for successively operating the said relays to apply the tone source audible to the party on the calling line during the operating interval of the relays responsive to the called line being encountered idle regardless of any other condition thereof.

69. In a telephone system, a calling and a called line, a plurality of linking switches for inclusion in a train to form a talking connection from the calling line to the called line, means for maintaining the talking connection open at and intermediate said link after a switch successive thereto has been operated, and automatically applied means responsive to the operation of the final switch of the train for closing the open connection regardless of control over the called line.

70. In a telephone system, a calling and a called line, a plurality of linking switches for inclusion in a train to form a talking connection from the calling line to the called line, means for barring connection to the selected called line when busy, means for maintaining the talking connection open at and intermediate said link after a switch successive thereto has been operated, and automatically applied means responsive to the final switch being operated into connective relation with the called line for closing the open connection regardless of control over the called line.

71. In a telephone system, a calling line, a called line, an automatic switch for linking said lines by a talking path of the switch, a back-bridge relay having its winding disconnected from said path, means controlled over the calling line for connecting the winding of the back-bridge relay to said path, and means controlled over the calling line for at will disconnecting said connected winding from said path.

72. In a telephone system, a calling line, a called line, an automatic switch for linking said lines by a talking path of the switch, a back-bridge relay having its winding disconnected from said path, means controlled over the calling line for connecting the winding of the back-bridge relay to said path, and means controlled over the called line for at will disconnecting said connected winding from said path.

73. In a telephone system, a calling line, a called line, an automatic switch for linking said lines by a talking path of the switch, a back-bridge relay having its winding disconnected from said path, means controlled over the calling line for connecting the winding of the back-bridge relay to said path, and means controlled over a branch of the calling line for at will disconnecting said connected winding from said path regardless of the calling and the called lines.

74. In a telephone system, a calling line, a called line, an automatic switch for linking said lines by a talking path of the switch, a back-bridge relay having its winding disconnected from said path, means controlled over the calling line for connecting the winding of the back-bridge relay to said path, means controlled over the calling line for at will disconnecting said connected winding from said path, and means controlled over the called line for at will disconnecting said connected winding from said path.

75. In a telephone system, a calling line, a called line, an automatic switch for linking said lines by a talking path of the switch, a front-bridge relay having its winding connected to said path, a back-bridge relay having its winding disconnected from said path, means including the front-bridge relay controlled over the calling line for connecting the winding of the back-bridge relay to said path, and means including last said means for thereafter at will disconnecting said connected winding from said path.

76. In a telephone system, a calling line, a called line, an automatic switch for linking said lines by a talking path of the switch, a front-bridge relay having its winding connected to said path, a back-bridge relay having its winding disconnected from said path, means responsive to an operation of the front-bridge relay for connecting the winding of the back-bridge relay to said path, and means responsive to an operation of the front-bridge relay for disconnecting the winding of the back-bridge relay from said path.

77. In a telephone system, a calling line, a called line, a train of automatic switches for connecting the calling line to the called line, a talking path of said switches for linking the connected calling and called lines in talking relation, an impulse conductor over which the switches are successively directively interlinked, means for maintaining the said talking path open at a point antecedent to the last switch linked, and means responsive to opening the impulse conductor at the last said switch linked for closing the said open talking path.

78. In a telephone system, a calling line, a called line, a train of automatic switches for connecting the calling line to the called line, a talking path of said switches for linking the connected calling and called lines in talking relation, an impulse conductor over which the switches are successively directively interlinked, means for maintaining the said talking path open at a point antecedent to the last switch linked, and means responsive to opening the impulse conductor for closing the said open talking path.

79. In a telephone system, a calling line, a called line, a train of automatic switches for connecting the calling line to the called line, a talking path of said switches for linking the connected calling and called lines in talking relation, an impulse conductor over which the switches are successively directively interlinked, means for maintaining the said talking path open at a point antecedent to the last switch linked, means responsive to opening the impulse conductor for closing the said open talking path, and means responsive to effecting connection to the called line for opening said impulse conductor.

80. In a telephone system, a calling line, a called line, a train of automatic switches for connecting the calling line to the called line, a talking path of said switches for linking the connected calling and called lines in talking relation, means for maintaining the said talking path open at a point antecedent to the last switch linked, and means responsive to last said switch of the train connecting to the called line for closing the said open talking path.

81. In an automatic telephone system, a calling line, called lines, a pair of selective switches, directive means operated over the calling line to operate one of said pair of switches into connection with one of said called lines, means operated over the calling line for thereupon operating the other of said pair of switches into connection with another of said called lines, and means for restoring first said element coincident with initiating the operation of said second element.

82. In an automatic telephone system, a calling line, called lines, a pair of selective switches, directive means operated over the calling line to operate one of said pair of switches into connection with one of said called lines, means operated over the calling line for thereupon operating the other of said pair of switches into connection with another of said called lines, means for restoring first said element coincident with initiating the operation of said second element, and means for preventing said first element from reoperating before the said operation of second said element terminates.

83. In an automatic telephone system, a calling line, called lines, a pair of selective switches, directive means operated over the calling line to operate one of said pair of switches into connection with one of said called lines, means operated over the calling line for thereupon operating the other of said pair of switches into connection with another of said called lines, means for restoring first said element coincident with initiating the operation of said second element, means for preventing said first element from reoperating before the said operation of second said element terminates, means operated over the calling line for thereupon again operating first said element to connect with one of said called lines, and means for restoring second said element coincident with initiating the operation of said first element.

84. In an automatic telephone system, a calling line, called lines, a pair of selective switches, a wiper shaft for the respective switches, other switches, directive means operated over the calling line to operate the shaft of one of said pair of switches and a plurality of other said switches to extend a connection from the calling line to one of said called lines, means operated over the calling line for thereupon operating the shaft of the other of said pair of switches and a plurality of other said switches to extend a connection from the calling line to another of said called lines, means operative for restoring the shaft of said one switch and first said other switches of first said connection coincident with initiating the operation of the shaft of said other switch, and means for disabling the operation of the shaft of said one switch after being restored until first thereafter establishing a connection by the operation of the shaft of said other switch and one of last said other switches.

85. In a telephone system, a calling line, a called line, automatic switch mechanism for linking a connection from the calling line to the called line, means on the calling line for initiating a call, means on the calling line for directively operating said switch mechanism to effect said connection only after initiating the call, means controlled over the called line for destroying said connection, and means alternatively controlled over the calling line for destroying said connection without abandoning the call thereon.

86. In a telephone system, a calling line, a called line, automatic switch mechanism for linking a connection from the calling line to the called line, means on the calling line for initiating a call, means on the calling line for directively operating said switch mechanism to effect said connection only after initiating the call, means controlled over the called line for destroying said connection, means controlled over the calling line for destroying said connection without abandoning the call, and means controlled over the calling line for destroying said connection responsive to abandoning the call thereon.

87. In a telephone system, a calling line, a pair of selective switches, a called line, sets of line terminals accessible from the respective said switches, means for automatically operating a first one of said switches to select a set of said terminals of last said switch corresponding to the called line, means on the called line for responding to said connection by closing a circuit path of the called line, means then controlled over said called line by means of short open impulse of said circuit path for directively operating the other switch into selective relation with a set of said terminals of last said switch, means controlled over said called line by only a prolonged opening of said circuit path provided the last said terminals have not yet been connected with by the operated said other switch for restoring last said switch, and means controlled over said called line by only a short opening of said circuit path provided the said terminals of last said switch have been connected with by last said switch for restoring last said switch.

88. In a telephone system, calling and called lines, automatic switches, means under the control of a subscriber on one of said calling lines for automatically operating a series of said switches for establishing a connection with a said called line, means then under control of the subscriber on the said called line for automatically directively operating another series of automatic switches to extend a Y-branch connection to a second one of said called lines, and means under the control of the subscriber on the first called line for performing four directive operations for automatically affecting certain of said automatic switches to thereby assure the subscriber on the first called line that said another series of switches are in their respective normally idle restored positions.

89. In a telephone system, calling and called lines, automatic switches, means under the control of a subscriber on one of said calling lines for automatically operating a series of said switches for establishing a connection with a said called line, means then under control of the subscriber on the said called line for automatically directively operating another series of automatic switches to extend a Y-branch connection to a second one of said called lines, and means under the control of the subscriber on the first called line for performing a predetermined plurality of directive operations for automatically affecting certain of said automatic switches to thereby assure the subscriber on the first called line that said another series of switches are in their respective normally idle restored positions and then subject to re-operation as before from said called line.

90. In a telephone system, calling and called lines, automatic switches, means for automatically operating a series of said switches for establishing a connection from one of said calling lines with a said called line, an impulse sending device on last said called line, means responsive to said impulse device for operating another series of said switches to extend a connection to a second one of said called lines from a Y-branch of said calling line, and means responsive to sending four single impulses by said sending device to assure the party operating said sending device that said another series of switches are in their respective normally idle restored positions while said calling line and said called line remain in established said connection.

91. In a telephone system, calling and called lines, automatic switches, means for automatically operating a series of said switches for establishing a connection from one of said calling lines with a said called line, an impulse sending device on last said called line, means responsive to said impulse device for operating another series of said switches to extend a connection to a second one of said called lines from a Y-branch of said calling lines, and means responsive to sending a plurality of impulses by said sending device to assure the party operating said sending device that said another series of switches are in their respective normally idle restored positions while said calling line and said called line remain in established said connection.

92. In a telephone system, a calling line, a first called line, a second called line, automatic switch mechanism, an impulse sending device on the calling line, means responsive to operating said sending device to send impulses for operating the switch mechanism to connect the calling line with said first called line, an impulse sending device on said second called line, means responsive to operating last said sending device to send impulses for operating the switch mechanism to include said second called line in a Y-branch of said connection, and means whereby then operating the impulse device on either one of said called lines will thereby disconnect the other called line from the three-party connection.

93. In a telephone system, a calling line, a first called line, a second called line, selective switches, automatic means for operating certain of said switches to effect a connection from the calling line to said first called line, a subscriber's manually operated switch on the called line operative to effect a response to said connection, a short impulse sending device on said first called line for successively directively operating certain ones of said switches to extend a Y-branch from the connection between the calling line and said first called line to said second called line, means whereby if all the switches in said Y-branch have not been operated to select said second called line last said switches operated can be restored at will by restoring said manually operated switch for a prolonged time, and means whereby if said second called line has been selected the last said switches can be restored by operating the sending device on said first called line but not restored by restoring said manually operated switch for a prolonged time.

94. In a telephone system, a calling line, a first called line, a second called line, selective switches, automatic means for operating certain of said switches to effect a connection from the calling line to said first called line, a subscriber's manually operated switch on the called line operative to effect a response of said connection, a short impulse sending device on said first called line for successively directively operating certain ones of said switches to extend a Y-branch from the connection between the calling line and said first called line to said second called line only after said manually operated switch has been operated to effect a circuit closure of said first called line, means whereby if all the switches in said Y-branch have not been operated to select said second called line last said switches operated can be restored at will by restoring said manually operated switch for a prolonged time, and means whereby if the said second called line has been selected the last said switches can be restored by operating the sending device on said first called line but not restored by restoring said manually operated switch for a prolonged time.

95. In a telephone system, a calling line, a first called line, a second called line, selective switches, automatic means for operating certain of said switches to effect a connection from the calling line to said first called line, a subscriber's manually operated switch on the called line operative to effect a response of said connection, a short impulse sending device on said first called line for successively directively operating certain ones of said switches to extend a Y-branch from the connection between the calling line and said first called line to said second called line only after said manually operated switch has been operated to effect a circuit closure of said first called line, means whereby if all the switches in said Y-branch have not been operated to select said second called line last said switches operated can be restored at will by restoring said manually operated switch for a prolonged time, means whereby if said second called line has been selected the last said switches can be restored by operating the sending device on said first called line but not restored by restoring said manually operated switch for a prolonged time, and means whereby closing and maintaining a circuit path between the talking conductors of second called line after it has been selected will not alter the operation of last said means.

96. In a telephone system, a calling line, a first called line, a second called line, selective switches, automatic means for operating certain of said switches to effect a connection from the calling line to said first called line, a subscriber's manually operated switch on the called line operative to effect a response to said connection, a short impulse sending device on said first called line for successively directively operating certain ones of said switches to extend a Y-branch from the connection between the calling line and said first called line to said second called line, and means depending upon whether all or only a part of last said switches have been operated will determine if the restoration of the last said switches operated can be restored from the said first called line only by operating said sending device or only by restoring said manually operated switch for a prolonged time.

97. In a telephone system, a calling line, a called line, automatic switches for extending a switch train connection from said calling line to said called line, means for barring said connection to the called line dependent upon the called line being busy, means controlled over the calling line for destroying said extension but only operable in case the called line is encountered idle, and other means controlled over the calling line for destroying said extension only operable in case the extension has not yet progressed to the called line.

98. In a telephone system, a calling line, a first called line, a second called line, selective switches, automatic means for operating certain of said switches to effect a connection from the calling line to said first called line, a subscriber's manually operated switch to effect a response on the first called line, a short impulse sending device on said first called line for operating one of said switches in extending a Y-branch connection from a point intermediate of the calling and said first called line to said second called line after said manually operated switch has been operated to effect a circuit closure of said first called line, means for barring connection to said second called line if busy, and means dependent upon if said second called line is encountered busy or is encountered idle for determining if last said switch can be restored from the first called line only by restoring said manual switch or only by operating said impulse device.

99. In a telephone system, a calling line, a called line, automatic switch mechanism for extending connection from said calling line to said called line, means for barring connection to said called line by the switch dependent upon the called line being busy, means controlled over the calling line for destroying the said extension only operable in case the called line is encountered idle, and other means controlled over the calling line for destroying the extension only operable in case the called line is encountered busy.

100. In a telephone system, a group of selective switches, a line having two sections, groups of terminal sets for the respective said line sections, a said terminal set corresponding to each said switch, automatic means for operating said switches into selective relation to its corresponding terminal set, a private conductor for each said section, a private terminal of the respective sets of terminals, the private terminals of the respective terminal sets connected to the corresponding section private conductor, means responsive to said selective operation being effective for making the private terminals of the corresponding section busy to bar further connection to the line through a terminal set of last said section without affecting the state of the private terminals of the other section.

101. In a telephone system, a group of contiguous selective switches, a line having two sections, groups of terminal sets for the respective said line sections, a said terminal set corresponding to each said switch, automatic means for operating said switches into selective relation to its corresponding terminal set, a private conductor for each said section, a private terminal of the respective sets of terminals, the private terminals of the respective terminal sets connected to the corresponding section private conductor, means responsive to said selective operation being effective for making the private terminals of the corresponding section busy to bar further connection to the line through a terminal set of last said section without affecting the state of the private terminals of the other section.

102. In an automatic telephone system, a calling line, a group of automatic linking switches any one of which may be connected with the calling line, a calling signal device specific to said calling line, means for initiating a call on said calling line for causing the calling line to be thereby extended to a random one of said automatic switches without affecting said calling signal device, a manually operated directive device on the calling line, means for operating said random automatic switch by a single manual operation of said directive device to further extend said calling line, and means responsive to a different single manual operation of said directive device for differently operating said random automatic switch to operate said signal device.

103. In an automatic telephone system, a calling line, a group of automatic linking switches any one of which may be connected with the calling line, an operator's answering jack specific for said calling line, a calling signal device specific to said calling line, means for initiating a call on said calling line for causing the calling line to be thereby extended to a random one of said automatic switches without affecting said calling signal device, a manually operated directive device on the calling line, means for operating said random automatic switch by a single manual operation of said directive device to further extend said calling line, means responsive to a different single manual operation of said directive device for differently operating said random automatic switch to operate said signal device, an operator's plug for connection to said jack, and means responsive to applying said plug to said jack for disconnecting said random switch for use in a new call while said initiated condition is maintained.

104. In an automatic telephone system, a calling line, a called line, a group of automatic switches any one of which may be connected with the calling line, an operator's answering jack specific for said calling line, a calling signal device specific for said calling line, an operator's answering plug for said jack for effecting a talking relation between the calling line and plug, means for initiating a call on said calling line for causing the calling line to be thereby extended to a random one of said automatic switches without affecting said calling signal device, a manually operated impulse device on the calling line, means whereby responsive to operating the impulse device in one manner will thereby operate said random switch to extend the calling line therethrough as a link in a connection to the called line, means whereby alternatively responsive to a single operation of the impulse device in another manner will thereby operate said random switch to cause said signal device to operate, and means whereby applying said plug to the jack will disconnect said random switch into idle condition subject to use in a new call while the call on said calling line remains non-abandoned.

105. In an automatic telephone system, a plurality of calling lines, a group of automatic switches any one of which may be seized from any one of said calling lines, an operator's answering jack specific for each said calling line, means for initiating a call on a random one of said calling lines for causing last said calling line to be thereby extended to a random one of said automatic switches without affecting the calling signal device corresponding to the said one random calling line, a manually operated directive device on the calling line, means responsive to a single operation of said directive device for causing said one random switch to link a further extension of the calling line, and means responsive to a single operation of said directive device for causing said one random switch to operate the signal device of said random calling line.

106. In a telephone system, a calling line, a link circuit, an automatic switch for extending connection from said calling line to said link circuit, another automatic switch, a leading-in line for last said switch, automatic means for extending last said switch into connection with said link circuit to establish a talking connection between said leading-in line and said calling line including said link circuit, and means thereafter at will controlled over said leading-in line for disconnecting first said automatic switch from said link circuit.

107. In a telephone system, a calling line, a link circuit, an automatic switch for extending connection from said calling line to said link circuit, another automatic switch, a leading-in line for last said switch, automatic means for extending last said switch into connection with said link circuit to establish a talking connection between said leading-in line and said calling line including said link circuit, and means thereafter at will controlled over said leading-in line for disconnecting said calling line from said link circuit.

108. In a telephone system, a calling line, a link circuit, an automatic switch for extending connection from said calling line to said link circuit, another automatic switch, a leading-in line for last said switch, automatic means for extending last said switch into connection with said link circuit to establish a talking connection between said leading-in line and said calling line including said link circuit, a called line, and means thereafter at will controlled over said leading-in line for disconnecting first said automatic switch from said link circuit and for connecting said automatic switch to said called line in lieu of said link circuit.

109. In a telephone system, a calling line, a link circuit, an automatic switch for extending connection from said calling line to said link circuit, another automatic switch, a leading-in line for last said switch, automatic means for extending last said switch into connection with said link circuit to establish a talking connection between said leading-in line and said calling line including said link circuit, a called line, and means thereafter at will controlled over said leading-in line for disconnecting said calling line from said link circuit and for connecting said calling line to said called line in lieu of said link circuit and said leading-in line.

110. In a telephone system, a calling line, a selective switch, a group of fixed line terminals, a set of movable terminals of the switch for sweeping the line terminals in a hunting operation, an impulse relay of the switch connected to the calling line and operated thereover for setting the switch said movable terminals into selective relation to said group preparatory to said hunting operation, a seizing relay of the switch for disconnecting the impulse relay and for connecting the calling line to said movable terminals responsive to an idle line being encountered in the hunting operation, and means for operating the seizing relay while retaining the impulse relay connected responsive to all the lines being hunted over as busy.

111. In a telephone system, a calling line, a called line, automatic switch mechanism for linking a connection between said lines, automatic means for directing the operation of said switch mechanism to effect said connection, means for applying a tone audible on the calling line responsive to only effecing said connection, and means whereby the tone will be applied regardless of any normal or abnormal circuit condition of the talking or other conductor of the called line connected with.

112. In a telephone system, a calling line, a called line, automatic switch mechanism for linking a connection between said lines, automatic means manually controlled by an operator for directing the operation of said switch mechanism to effect said connection, means for effecting a signal to the operator responsive to effecting said connection, and means whereby an abnormal condition of the called line connected with cannot disable the effecting of the signal.

113. In a telephone system, a calling line, a called line, automatic switch mechanism for linking a connection between said lines, automatic means manually controlled by an operator for directing the operation of said switch mechanism to effect said connection, a first source of signaling current for application to the called line responsive to effecting said connection, means responsive to applying said first source of signaling current to the called line for applying a signal to the operator, a second signaling current source, and means for applying said second source of signaling current to effect a signal to the operator responsive to effecting said connection regardless of said first source of signaling current.

114. In a telephone system, a calling line, a called line, automatic switch mechanism for selecting and extending a connection from the calling line to the called line, two tone sources, a ring-cut-off relay of the said switch mechanism, means for barring connection to the called line only if encountered busy, and means for inductively applying one or the other said tone source to the calling line through the agency of the winding of said relay dependent upon whether the called line is idle or busy when selected.

115. In a telephone system, a main and a branch exchange, two way trunk lines connecting said exchanges, an automatic switch in said branch exchange in which one of said trunk lines terminates, telephone lines in said branch exchange, other automatic switches in said branch exchange having access to said two way trunk lines, means for seizing one of said two way trunk lines in said main exchange and for operating the associated automatic switch in the branch exchange to extend a connection to one of said telephone lines, means for operating one of said other automatic switches to connect with said seized trunk line and for releasing the associated automatic switch, and means controlled from the called line for reoperating said released automatic switch in order to extend a connection to another of said telephone lines.

116. In a telephone system, calling and called lines, a plurality of automatic switches, means operated over the calling line for causing certain of said switches to interlink a connection from the calling line to one of said called lines, means operated over the said called line for disconnecting the said called line from the calling line, means operated over the called line for at will establishing connection from the said called line to the calling line by certain of said switches other than used in the first mentioned connection, and means operated over the said called line for reoperating first said certain of said switches to interlink a connection from the calling line to another of said called lines.

117. In a telephone system, calling and called lines, a plurality of automatic switches, means operated over the calling line for causing certain of said switches to interlink a connection from the calling line to one of said called lines, means operated over the said called line for disconnecting the said called line from the calling line, means operated over the called line for at will establishing connection from the said called line to the calling line by certain of said switches other than used in the first mentioned connection, and means operated over the said called line for reoperating first said certain of said switches to interlink a connection from the calling line to another of said called lines wherein a Y connection will exist between the calling line and the two said called lines as three branches from a common interconnection point.

118. In a telephone system, calling and called lines, automatic switch mechanism, means operated over the calling line for causing said switch mechanism to connect the calling line with a said called line, means operated over the called line for disconnecting the called line from the calling line, means operated over the called line for at will establishing connection from the called line to the calling line, and means operated over the called line for reoperating said switch mechanism to establish a connection from the calling line to another of said called lines while the said calling line has been maintained connected with the switch mechanism wherein a Y connection will exist between the calling line and the two said called lines as three branches from a common interconnection point.

119. In a telephone system, calling and called lines, a plurality of automatic switches, means operated over the calling line for causing a train of said switches to interlink a connection from the calling line to one of said called lines, means operated over the said called line for disconnecting the said called line from the calling line, means operated over the said called line for at will establishing connection from the said called line to the calling line, and means operated over the said called line for reoperating said train of switches to establish a connection from the calling line to another said called line wherein a Y connection will exist between the calling line and the two said called lines as three branches from a common interconnection point.

120. In a telephone system, calling and called stations, means under control of a calling station for establishing a connection with a called station through a series of automatic switches, means whereby the called station may disconnect therefrom by releasing one of said automatic switches, means whereby the said called station can establish and release a new connection excluding the said calling station, means whereby the said called station can then re-establish connection with said calling station before the receiver of the latter has been replaced, and means controlled from said called station whereby the established connection may thereafter be extended from a point intermediate of the calling and called stations to include another station wherein a remotely operated automatic switch forms a link of the latter extended connection.

121. In an automatic telephone system, a calling line, a called line, automatic switches, means for sending directive impulses over the calling line to directively operate a train of said switches to thereby link a connection from the calling line to the called line, and means responsive to a single said impulse next following the completion of the said connection for restoring certain of said linked switches while retaining certain of said switches in their said linked condition.

In witness whereof, I hereunto subscribe my name this 19th day of August, 1927.

HERBERT M. FRIENDLY.